(12) United States Patent
Owens et al.

(10) Patent No.: US 11,137,056 B2
(45) Date of Patent: Oct. 5, 2021

(54) GEARBOX ASSEMBLY

(71) Applicant: GE Global Sourcing LLC, Norwalk, CT (US)

(72) Inventors: Steven Owens, Erie, PA (US); Kevin Fisher, Erie, PA (US); Justin Wetzel, Erie, PA (US); James Bishar, Erie, PA (US); Ronald Koerber, Erie, PA (US); Michael Sirak, Erie, PA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 273 days.

(21) Appl. No.: 16/371,677

(22) Filed: Apr. 1, 2019

(65) Prior Publication Data

US 2019/0316663 A1    Oct. 17, 2019

Related U.S. Application Data

(60) Provisional application No. 62/657,469, filed on Apr. 13, 2018.

(51) Int. Cl.
*F16H 37/02* (2006.01)
*F16H 57/00* (2012.01)
(Continued)

(52) U.S. Cl.
CPC ............ *F16H 37/02* (2013.01); *B61C 9/00* (2013.01); *F16H 1/20* (2013.01); *F16H 7/02* (2013.01);
(Continued)

(58) Field of Classification Search
CPC ..... F16H 37/02; F16H 57/0025; F16H 57/023
(Continued)

(56) References Cited

U.S. PATENT DOCUMENTS

| 2,453,483 A | 11/1948 | Yingling |
| 4,289,045 A | 9/1981 | Brisabois |

(Continued)

FOREIGN PATENT DOCUMENTS

| CN | 105460022 A | 4/2016 |
| DE | 4421785 A1 | 1/1996 |

(Continued)

OTHER PUBLICATIONS

Search Report dated Aug. 9, 2019 for corresponding European Patent Application No. 19168337.4 (11 pages).

(Continued)

*Primary Examiner* — Ha Dinh Ho
(74) *Attorney, Agent, or Firm* — Christopher R. Carroll; The Small Patent Law Group LLC

(57) ABSTRACT

An engine system includes a gearbox assembly that includes a housing having plural interconnected gears disposed between an engine side of the housing and an alternator side of the housing, a rotatable engine coupler connected with the engine side of the housing, the engine coupler configured to engage a rotatable shaft of an engine, and a rotatable alternator coupler connected with the alternator side of the housing, the alternator coupler configured to engage a rotor of a first alternator. The housing is configured to be positioned between the engine and the first alternator. The engine coupler is configured to engage the engine that is resiliently mounted in the powered system and the alternator coupler is configured to engage the first alternator that is rigidly mounted in the powered system to transfer rotation of the shaft of the engine to rotation of the rotor of the first alternator.

19 Claims, 16 Drawing Sheets

(51) Int. Cl.
    *F16H 57/023*     (2012.01)
    *B61C 9/00*     (2006.01)
    *F16H 1/20*     (2006.01)
    *F16H 7/02*     (2006.01)
    *H02K 7/18*     (2006.01)
    *F16H 57/02*     (2012.01)

(52) U.S. Cl.
    CPC ....... *F16H 57/0025* (2013.01); *F16H 57/023* (2013.01); *H02K 7/1807* (2013.01); *F16H 2057/02043* (2013.01)

(58) Field of Classification Search
    USPC .................................................. 74/745, 606 R
    See application file for complete search history.

(56) References Cited

U.S. PATENT DOCUMENTS

| | | | |
|---|---|---|---|
| 5,694,765 A | 12/1997 | Hield et al. | |
| 6,267,062 B1* | 7/2001 | Hamilton, Jr. | B61C 7/04 |
| | | | 105/26.05 |
| 6,279,309 B1* | 8/2001 | Lawlor | F01D 25/285 |
| | | | 60/39.35 |
| 8,167,062 B2* | 5/2012 | Wolff | H02K 7/1815 |
| | | | 180/65.21 |
| 8,820,247 B1 | 9/2014 | Claussen et al. | |
| 2003/0213460 A1 | 11/2003 | Schwam | |
| 2004/0112654 A1* | 6/2004 | Kozarekar | B60L 50/61 |
| | | | 180/65.235 |
| 2007/0145745 A1* | 6/2007 | Woods | F01P 3/00 |
| | | | 290/1 A |
| 2008/0185925 A1 | 8/2008 | Kurple | |
| 2009/0166113 A1 | 7/2009 | Luo et al. | |
| 2009/0239703 A1* | 9/2009 | Carlhammar | B60W 10/08 |
| | | | 477/3 |
| 2009/0290976 A1 | 11/2009 | Suciu et al. | |
| 2014/0265331 A1 | 9/2014 | Creviston | |
| 2018/0291818 A1 | 10/2018 | Suciu et al. | |
| 2018/0316150 A1 | 11/2018 | Russikoff | |
| 2018/0327020 A1 | 11/2018 | Gagne et al. | |

FOREIGN PATENT DOCUMENTS

| | | |
|---|---|---|
| WO | 2012058713 A1 | 5/2012 |
| WO | 2016112094 A1 | 7/2016 |

OTHER PUBLICATIONS

Fanchon "Accouplements Embrayages Freins" guide Des Sciences et Technologies Industrie, Afnor (11 pages).

* cited by examiner

GEARBOX ASSEMBLY

CROSS-REFERENCE TO RELATED APPLICATIONS

This application claims priority to U.S. Provisional Application No. 62/657,469, which was filed on 13 Apr. 2018, and the entire disclosure of which is incorporated herein by reference.

FIELD

The subject matter described herein relates to connections between engines and other devices, such as alternators or generators.

BACKGROUND

A variety of powered systems include engines that consume a fuel to rotate a shaft. This shaft may be connected with an alternator or generator, which converts rotation of the engine shaft into electric current. For example, some vehicles may include engines that are coupled with alternators to create electric current. The electric current is then used to power motors that propel the vehicles.

The engine and alternator in a powered system can be rigidly coupled to a platform or other frame body of the powered system. For example, the engine and alternator may be bolted or otherwise secured to the platform such that the engine and alternator do not move relative to the platform.

This rigid mounting of the engine and alternator can pose problems if the engine is replaced. For example, a vehicle owner may wish to replace a rigidly mounted engine with a resiliently mounted engine that is able to move relative to the platform (e.g., to absorb vibrations). But, the resiliently mounted engine may not be able to interface with the rigidly mounted alternator due to the allowance for movement by the engine but the rigid mounting of the alternator. The shaft connection between the engine and the alternator may be subject to vibrations, movements, and the like, that damage or hinder operation of the engine and/or alternator.

BRIEF DESCRIPTION

In one embodiment, an engine system includes a gearbox assembly that includes a housing having plural interconnected gears disposed between an engine side of the housing and an alternator side of the housing, a rotatable engine coupler connected with the engine side of the housing, the engine coupler configured to engage a rotatable shaft of an engine, and a rotatable alternator coupler connected with the alternator side of the housing, the alternator coupler configured to engage a rotor of a first alternator. The housing is configured to be positioned between the engine and the first alternator. The engine coupler is configured to engage the engine that is resiliently mounted in the powered system and the alternator coupler is configured to engage the first alternator that is rigidly mounted in the powered system to transfer rotation of the shaft of the engine to rotation of the rotor of the first alternator.

In one embodiment, an engine system includes a gearbox assembly that includes a housing having plural interconnected gears disposed between an engine side of the housing and an alternator side of the housing. The housing is configured to be positioned between an engine of a powered system and a first alternator. The engine system also includes rotatable engine coupler connected with the engine side of the housing. The engine coupler configured to engage a rotatable shaft of the engine. The engine system also includes a rotatable alternator coupler connected with the alternator side of the housing. The alternator coupler is configured to engage a rotor of the first alternator. The engine coupler is configured to engage the engine and the alternator coupler is configured to engage the first alternator to transfer rotation of the shaft of the engine to rotation of the rotor of the first alternator. The engine system also includes an auxiliary rotatable shaft projecting from the housing and configured to interconnect with a rotor of one or more of an auxiliary alternator or an auxiliary generator, the auxiliary rotatable shaft coupled with the engine coupler by the interconnected gears in the housing.

In one embodiment, a gearbox assembly includes a housing having plural interconnected gears disposed between an engine side of the housing and an alternator side of the housing. The housing is configured to be positioned between an engine of a powered system and a first alternator to transfer rotation of a shaft of the engine to rotation of a rotor of the first alternator. The assembly also includes a closed loop lubrication system fluidly coupled with an interior chamber inside the housing and configured to be fluidly coupled with a liquid lubrication circuit of the engine. The closed loop lubrication system is configured to direct lubricant in the engine into the interior chamber of the housing and to direct the lubricant exiting the interior chamber back to the liquid lubrication circuit of the engine.

In one embodiment, a shaft assembly includes a rotatable engine coupler configured to be connected with a gearbox assembly and with a rotatable shaft of an engine, and a rotatable alternator coupler configured to be connected with the gearbox assembly and with a rotor of an alternator. Both the engine coupler and the alternator coupler are configured to be inserted into a common rotatable receptacle in the gearbox assembly to translate rotation of the shaft of the engine to rotation of the rotor of the alternator.

BRIEF DESCRIPTION OF THE DRAWINGS

The present inventive subject matter will be better understood from reading the following description of non-limiting embodiments, with reference to the attached drawings, wherein below.

DETAILED DESCRIPTION

One or more embodiments of the inventive subject matter described herein provide engine systems for coupling an engine with an alternator and optionally one or more other components. The systems described herein can be used to retrofit a powered system with a new or different engine (e.g., relative to a previously used engine of the powered system). The systems can couple a resiliently mounted engine with rigidly mounted components, such as a rigidly mounted alternator and/or air compressor.

Figure 1:
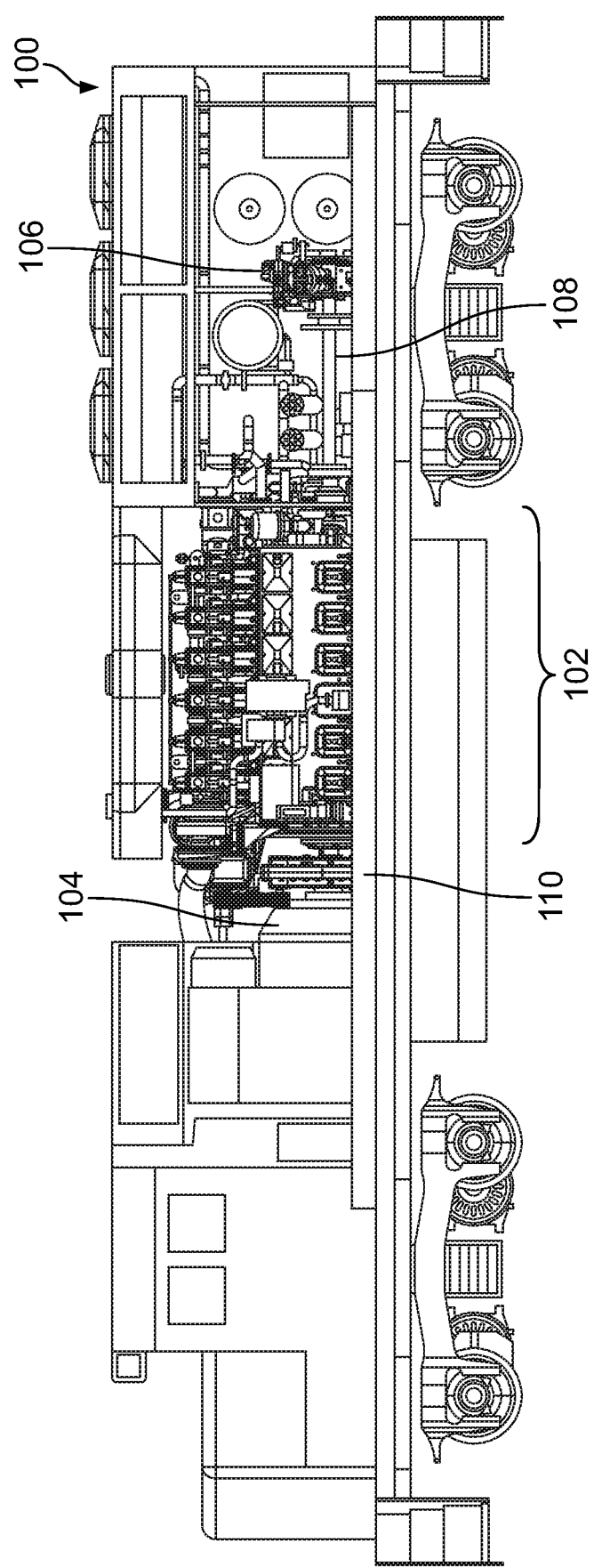
FIG. 1 illustrates one example of a powered system.
Figure 2:
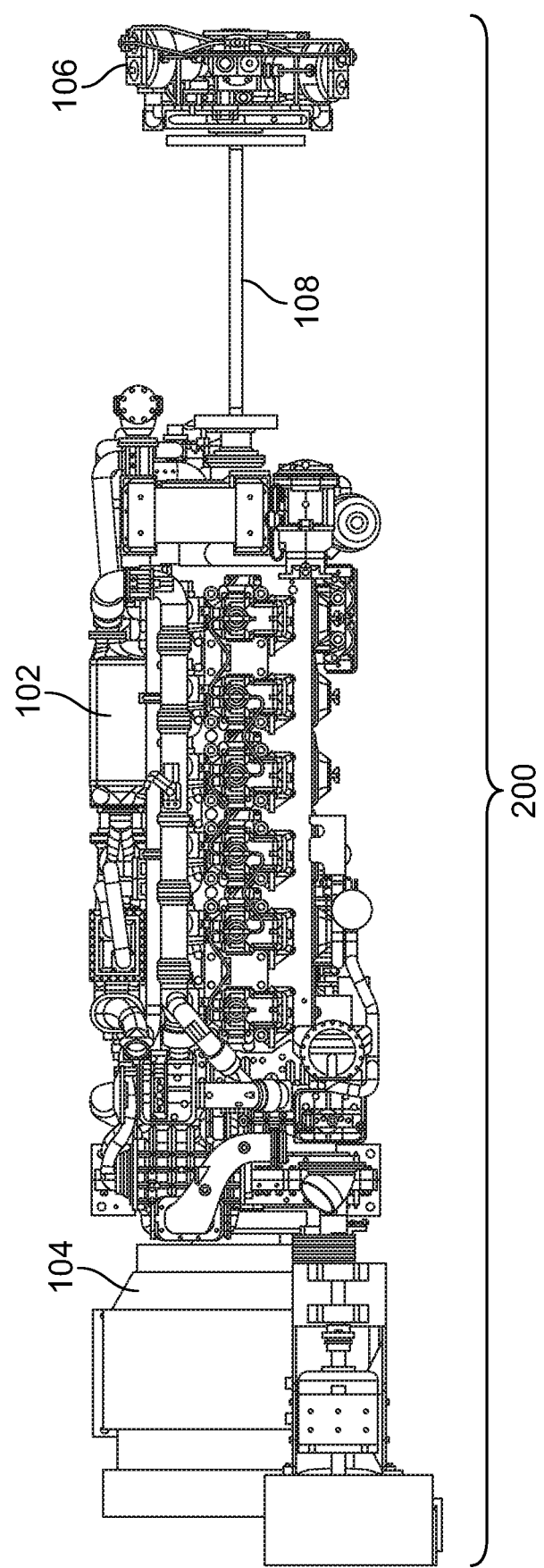
FIG. 2 illustrates one example of an engine system that is onboard the powered system.

FIG. 1 illustrates one example of a powered system 100. FIG. 2 illustrates a known engine system 200 that is onboard the powered system 100. In the illustrated embodiment, the powered system 100 is a vehicle, specifically a locomotive. Alternatively, the powered system 100 may be another type of vehicle, such as an automobile, a truck, a mining vehicle, another type of off-highway vehicle (for example, a vehicle that is not designed for travel on public roadways or is not legally permitted for travel on public roadways), a marine vessel, or the like. The powered system 100 alternatively may be a stationary system, such as a stationary power-generating system.

The engine system 200 includes an engine 102 that consumes fuel to rotate an engine shaft. This rotating engine shaft is coupled with an alternator 104. (Unless otherwise specified, "alternator" and "generator" are used synonymously herein to refer generally to any electro-mechanical device that converts a rotating mechanical movement to electrical power, be it AC or DC.) For example, the engine shaft may be connected with a rotor of the alternator 104. The alternator 104 creates electric current based on rotation of the rotor caused by rotation of the engine shaft by the engine 102. In the illustrated example, the powered system also includes an air compressor 106 which also is connected with the engine 102 by a compressor shaft 108. The engine 102 operates to rotate the compressor shaft 108, which powers the air compressor 106. Alternatively, the air compressor 106 may be another type of device that is powered by or otherwise operates via rotation of the shaft 108 by the engine 102 (i.e., the system may include multiple shaft-driven devices coupled to the engine).

The engine system 200 may be rigidly mounted to the powered system 100. For example, the powered system 100 may include a platform 110 on which some components of the engine system 200 are bolted, secured, or otherwise fixed, such that at least some of the components of the engine system 200 are not able to move relative to the platform 110. This rigid mounting may involve bolting housings of the alternator 104, the engine 102, and/or the air compressor 106 to the platform 110. Rigidly mounting these components to the same platform 110 can help to ensure that the rotational movement generated by the engine 102 operates to rotate the rotor of the alternator 104 and the compressor shaft 108 connected to the compressor 106, but also may not allow for the absorbing of vibrations that occur during operation of the powered system 100. These vibrations can damage or otherwise deteriorate the components of the engine system 200.

One or more embodiments of the inventive subject matter described herein provide for systems, assemblies, and methods that allow for a resiliently mounted engine of the powered system 100 to be operably connected with the rigidly mounted alternator 104 and/or the rigidly mounted air compressor 106. This can allow for the resilient or flexible mounts of the engine to absorb vibrations and other relatively small movements of the engine, while allowing the engine to rotate shafts that power the air compressor 106 and the alternator 104.

Figure 3:
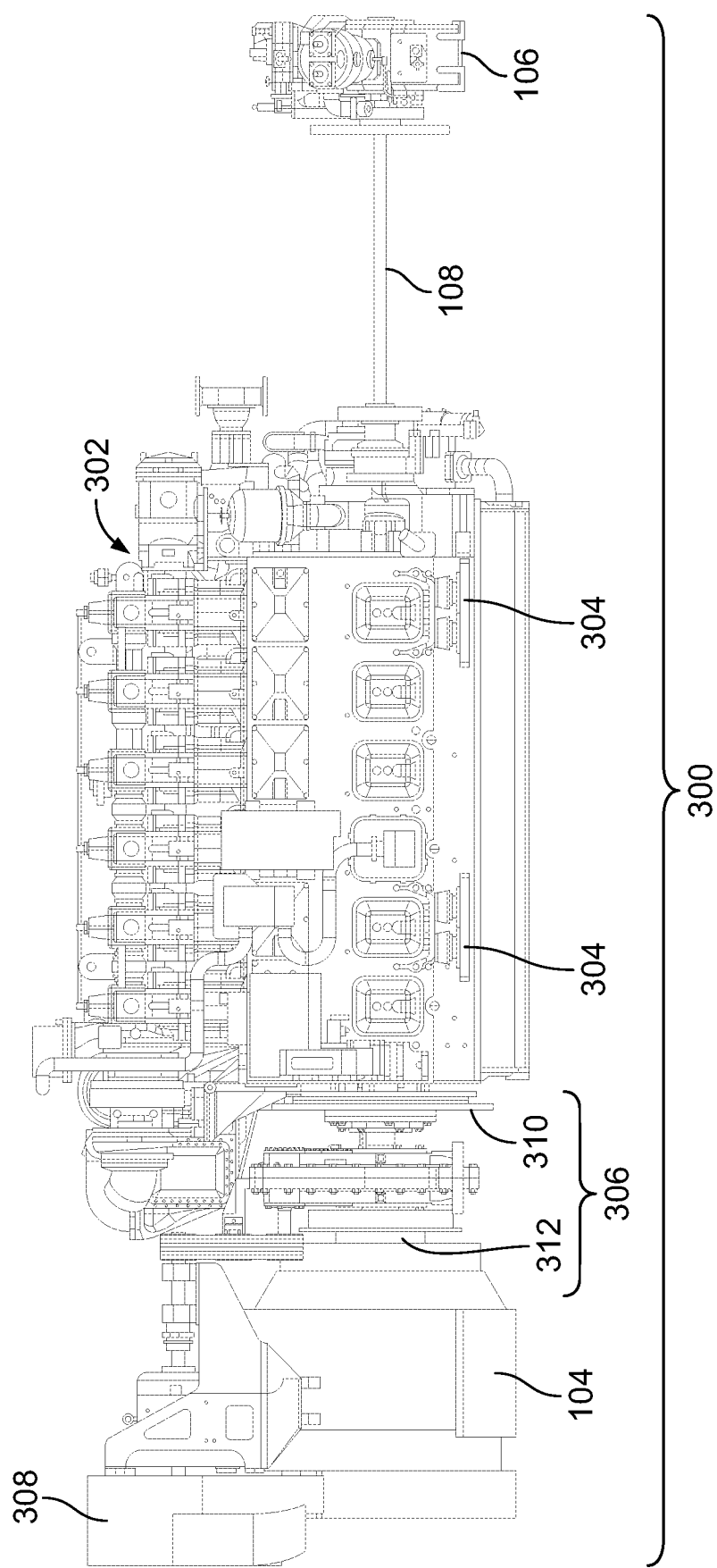
FIG. 3 illustrates an engine system according to one embodiment of the inventive subject matter described herein.

FIG. 3 illustrates an engine system 300 according to one embodiment of the inventive subject matter described herein. The engine system 300 includes an engine 302 can be resiliently mounted to the platform 110 of the powered system 100 in place of the engine 102. For example, an owner or operator of the powered system 100 may remove the rigidly mounted engine 102 and replace the engine 102 with the resiliently mounted engine 302, while still coupling the engine 302 with the alternator 104 and/or the compressor 106. The engine 302 may be supported on the platform 110 by several resilient mounts 304. These resilient mounts 304 may include flexible bodies that both hold the engine 302 in place on the platform 110, while absorbing relatively small vibrations that occur during operation of the engine 302. Alternatively, the engine 302 may be the original engine, and not a replacement engine, of the powered system 100.

In contrast to the engine 102 shown in FIGS. 1 and 2, the engine 302 may not be directly coupled with the alternator 104. For example, the engine 102 may be directly coupled with the rotor of the alternator 104 with no intervening components between the shaft of the engine 102 and the rotor of the alternator 104. The engine 302, however, may be connected with the rotor of the alternator 104 by a gearbox assembly 306. The gearbox assembly 306 of the engine system 300 can connect the resiliently mounted engine 302 with the rigidly mounted alternator 104 without having to move, disassemble, or otherwise modify the alternator 104.

In the illustrated embodiment, the gearbox assembly 306 also is connected with an auxiliary alternator or generator 308. As described below, the gearbox assembly 306 can translate or transfer rotation of an engine shaft (that is coupled with a flywheel 310) to rotation of a rotor 312 of the alternator 104 and optionally to rotation of a rotor of an auxiliary alternator or generator 308.

Figure 4:
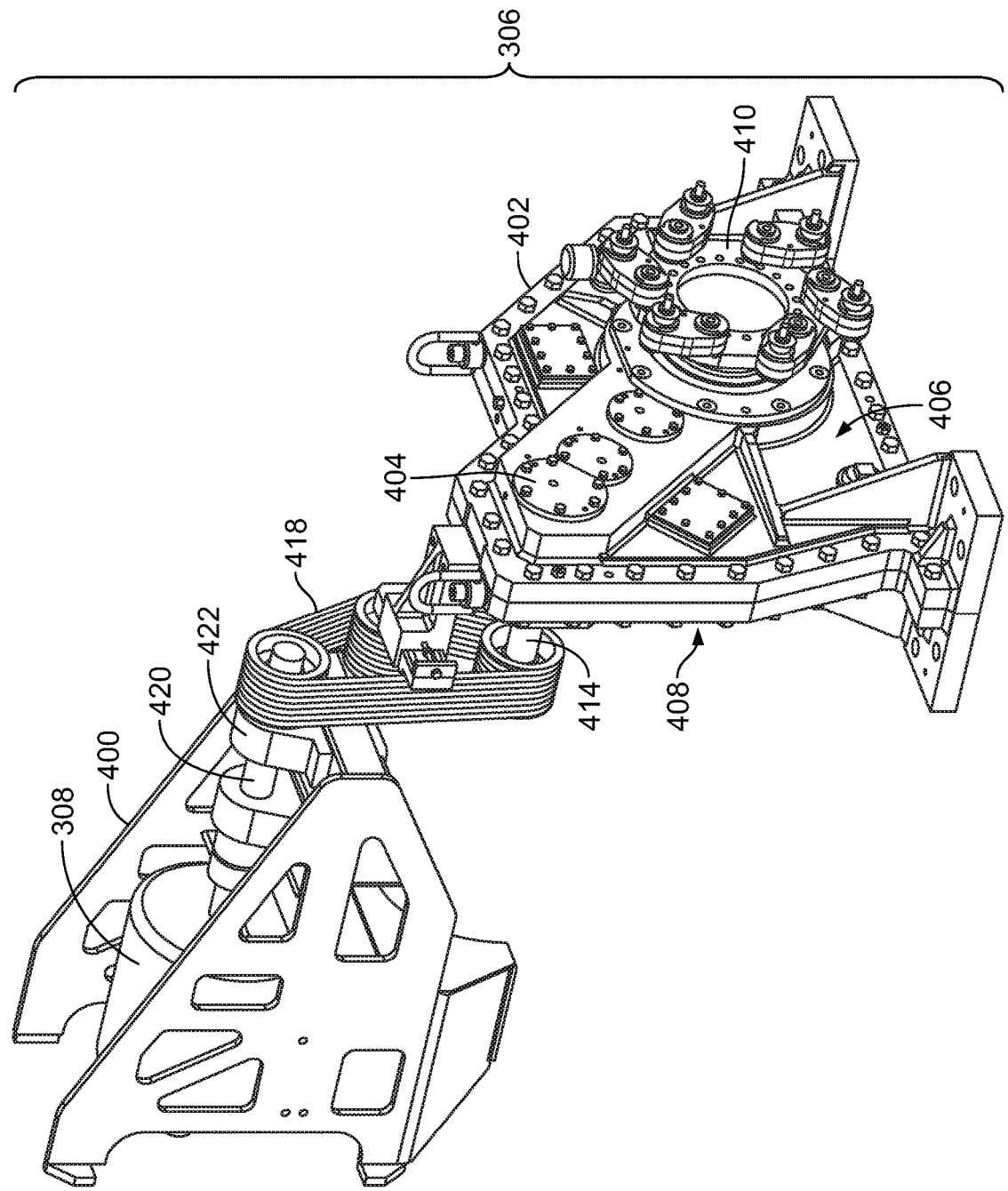
FIG. 4 illustrates a perspective view of a gearbox assembly shown in FIG. 3 and an auxiliary mounting bracket according to one embodiment of the inventive subject matter.
Figure 5:
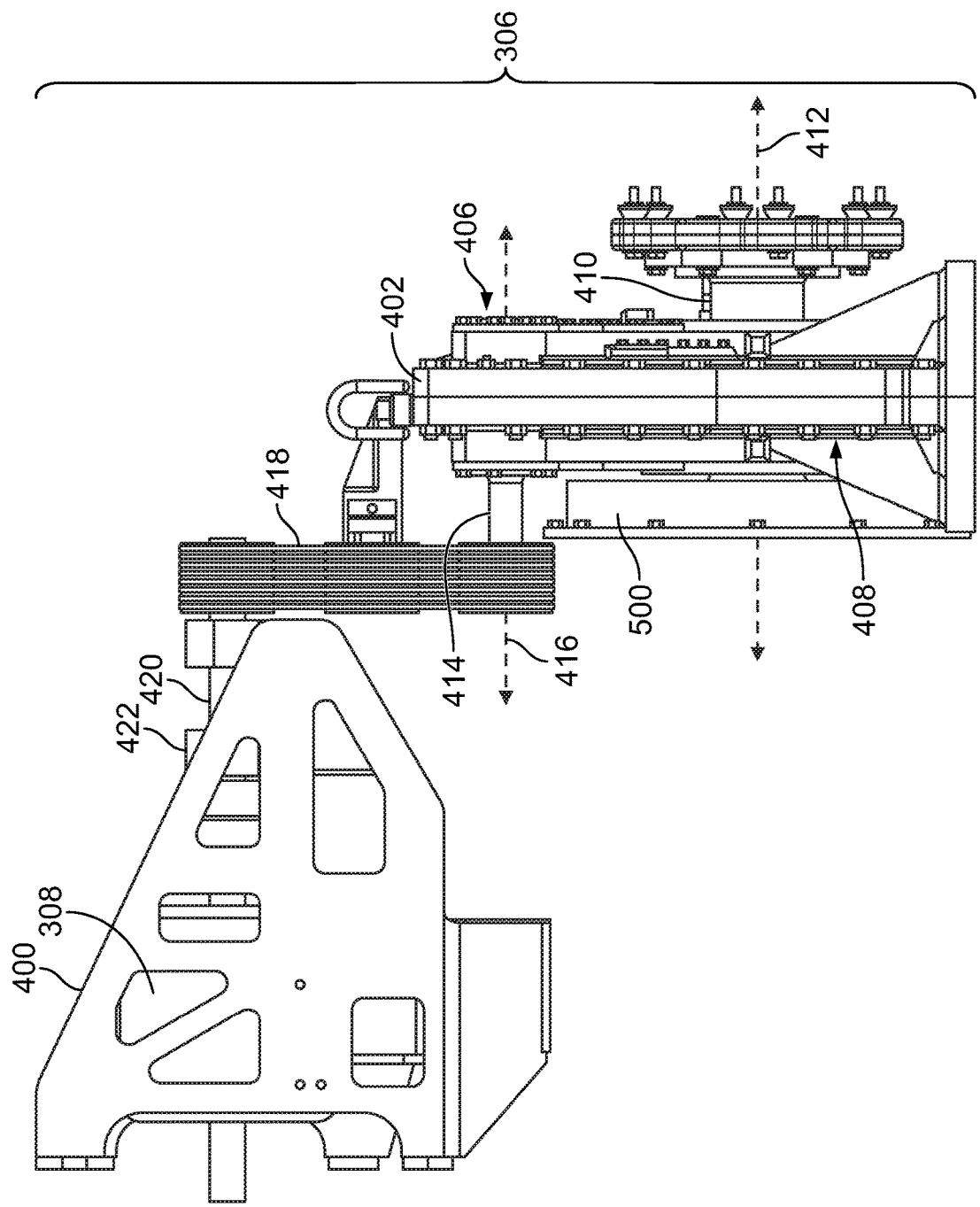
FIG. 5 illustrates a side view of the gearbox assembly shown in FIG. 3 and the auxiliary mounting bracket shown in FIG. 4.

FIG. 4 illustrates a perspective view of the gearbox assembly 306 and an auxiliary mounting bracket 400 according to one embodiment of the inventive subject matter. FIG. 5 illustrates a side view of the gearbox assembly 306 and the auxiliary mounting bracket 400 shown in FIG. 4. The gearbox assembly 306 includes an outer housing 402 having several gears 404 disposed in an interior chamber of the housing 402. The housing 402 extends from an engine side 406 to an opposite alternator side 408. The engine side 406 of the housing 402 faces the engine 302 while the alternator side 408 of the housing 402 faces the alternator 104. The housing 402 of the gearbox assembly 306 may be relatively thin in a direction extending from the engine 302 to the alternator 104 due to size constraints within the powered system 100.

The gearbox assembly 306 includes an engine coupler 410 that is connected with and/or projects from the engine side 406 of the housing 402. The engine coupler 410 can be rotatable in that the engine coupler 410 can rotate around or about an axis of rotation 412 relative to the housing 402. The housing 402 may be rigidly mounted to the platform 110 of the powered system 100 while the engine coupler 410 is free to rotate about or around the axis 412. As described below, the engine coupler 410 connects with the flywheel 310 of the engine 302. Rotation of the flywheel 310 by the shaft of the replacement engine 302 causes the engine coupler 410 to rotate due to the connections between the engine coupler 410 and the flywheel 310, as described below.

The gearbox assembly 306 also includes an alternator coupler 500 that is connected with and/or projects from the alternator side 408 of the housing 402. Like the engine coupler 410, the alternator coupler 500 also is rotatable relative to the housing 402. The alternator coupler 500 is shaped to be coupled directly or indirectly with the rotor of the alternator 104. As described below, the gearbox assembly 306 interconnects the rotatable engine coupler 410 with the rotatable alternator coupler 500 so that rotation of the engine coupler 410 around or about the axis 412 is translated or transferred to rotation of the alternator coupler 500 around or about the axis 412. Rotation of the alternator coupler 500 causes rotation of the rotor inside the alternator 104, thereby creating electric current.

In one embodiment, the alternator coupler 500 supports and radially positions the rotor in the alternator 104. The rotor of the alternator 104 may be a single bearing rotor that is supported by a bearing on an end of the alternator that is opposite of the end of the alternator 104 that connects with the alternator coupler 500. This can result in the rotor of the alternator 104 being similar to a cantilevered beam that requires support by the alternator coupler 500 to center the rotor on or around the axis 412, and to cause the rotor to rotate around or about the axis 412. The alternator coupler 500 can ensure that the rotor is radially centered on the axis 412.

The gearbox assembly 306 also can include an auxiliary shaft 414 that projects from the alternator side 408 of the housing 402 of the gearbox assembly 306. This auxiliary shaft 414 may be rotatable around or about another axis 416 of rotation. The internal gears 404 of the gearbox assembly 306 can interconnect the rotatable engine coupler 410 to the rotatable auxiliary shaft 414 inside the interior chamber of the gearbox assembly 306. Rotation of the engine coupler 410 by the engine 302 and the flywheel 310 is translated or transferred by the gears 404 into rotation of the auxiliary shaft 414.

In one embodiment, the internal gears 404 and the gearbox assembly 306 are sized and/or shaped to increase the rotational speed imparted to the auxiliary shaft 414 by rotation of the engine coupler 410. As one example, the gears 404 in the gearbox assembly 306 can step up the rotational speed of the engine coupler 410 to a faster rotational speed of the auxiliary shaft 414, such as by tripling the rotational speed. This can result in the auxiliary shaft 414 rotating at a speed that is three times faster than the concurrent or simultaneous rotational speed of the engine coupler 410 (caused by rotation of the engine shaft). Alternatively, the gears 404 of the gearbox assembly 306 may step up or increase the rotational speed of the engine coupler 410 by another amount. Optionally, the gears 404 of the gearbox assembly 306 may reduce the rotational speed of the engine coupler 410 such that the engine coupler 410 is rotated at a faster rotational speed than the auxiliary shaft 414. In another embodiment, the gears 404 and the gearbox assembly 306 may maintain the rotational speeds of the engine coupler 410 and the auxiliary shaft 414 to be the same rotational speed.

The auxiliary shaft 414 rotates around or about the axis 416 to rotate a belt 418 of the gearbox assembly 306. The belt 418 also is connected with an auxiliary shaft 420 of the auxiliary alternator or generator 308. The auxiliary shaft 420 of the auxiliary alternator or generator 308 is coupled with the rotor inside the alternator or generator 308, such that rotation of the auxiliary shaft 420 results in rotation of the rotor within the alternator or generator 308, thereby creating additional electric current.

In operation, the engine coupler 410 is rotated by the engine 302 rotating the flywheel 310 via the engine shaft. Rotation of the engine coupler 410 is translated into rotation of the alternator coupler 500 by the gearbox assembly 306. This rotation of the alternator coupler 500 also rotates the rotor of the alternator 104, which creates electric current. The gears 404 of the gearbox assembly 306 also transfer or translate rotation of the engine coupler 410 into rotation of the auxiliary shaft 414. Rotation of the auxiliary shaft 414 rotates the belt 418, which also rotates the auxiliary shaft 420. Rotation of the auxiliary shaft 420 rotates the rotor inside the auxiliary alternator or generator 308, thereby generating the additional electric current.

The mounting bracket 400 can be connected with the exterior housing of the alternator 104, as shown in FIG. 3. The mounting bracket 400 can support and position the auxiliary alternator or generator 308 and the auxiliary shaft 420. The mounting bracket 400 can include several pillow block bearings 422 that support and radially position the auxiliary shaft 420. The illustrated position or location of the bracket 400 is one example of where the bracket 400 can be located. In another embodiment, the bracket 400 may be in another location on the outside of the alternator 104. For example, the bracket 400 is shown in a ten o'clock position around the outer circumference of the exterior surface of the alternator 104. Alternatively, the bracket 400 can be in another location, such as the twelve o'clock position, the two o'clock position, or the like.

Figure 6:
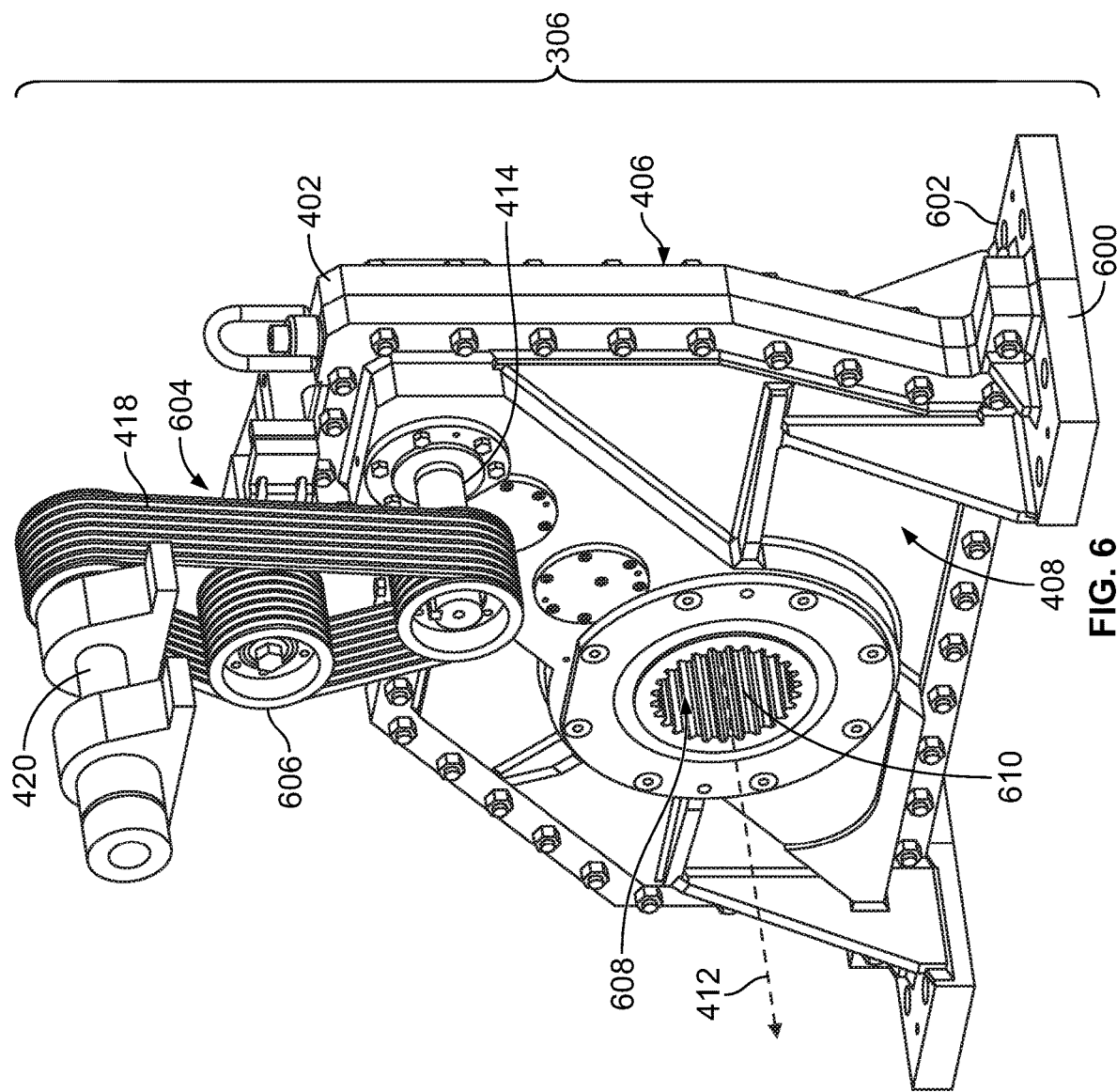
FIG. 6 illustrates another perspective view of one embodiment of the gearbox assembly shown in FIG. 3.

FIG. 6 illustrates another perspective view of one embodiment of the gearbox assembly 306 with the engine coupler 410 shown in FIG. 4 and the alternator coupler 500 shown in FIG. 5 removed. The housing 402 of the gearbox assembly 306 can include several feet plates 600. These plates 600 can include holes 602, openings 602, or the like, through which bolts or other fasteners are inserted to mount the gearbox assembly 306 to the platform 110 of the powered system 100. As described above, the housing 402 of the gearbox assembly 306 can be rigidly mounted the platform 110 of the powered system 100. Alternatively, one or more flexible bodies (such as rubber plates) can be positioned between the plates 600 of the gearbox assembly 306 and the platform 110 to absorb vibrations, movements, or the like, of the gearbox assembly 306.

Figure 7:
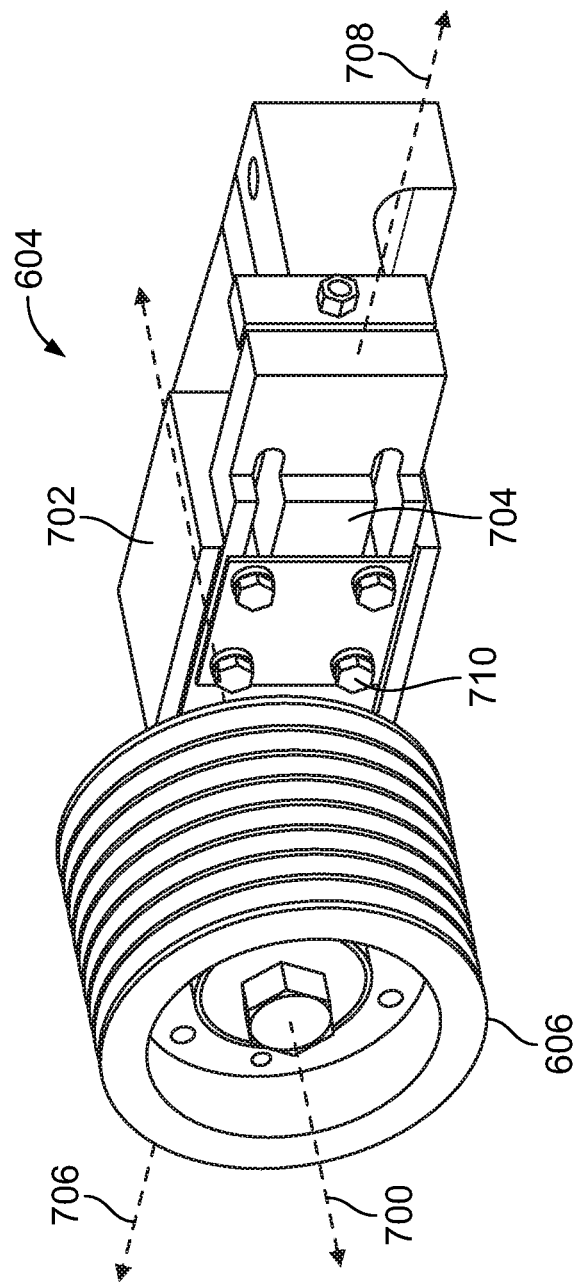
FIG. 7 includes a perspective view of a tensioner device shown in FIG. 6 according to one embodiment.

Also shown in FIG. 6 is a tensioner device 604 of the gearbox assembly 306. FIG. 7 includes a perspective view of the tensioner device 604 according to one embodiment the tensioner device 604. The tensioner device 604 includes a rotatable or rounded body 606 that engages the belt 418. This body 606 optionally can rotate around or about an axis 700 shown in FIG. 7. Alternatively, the body 606 may not rotate. The tensioner device 604 includes an arm 702 (shown in FIG. 7) in which a bar 704 (shown in FIG. 7) can slide. For example, the bar 704 may slide within the arm 702 in opposite directions 706, 708. One or more fasteners 710 can be tightened to limit or stop movement of the bar 704 within the arm 702, and can be loosened to allow movement of the bar 704 within the arm 702. The bar 704 is connected with the body 606 such that movement of the bar 704 along or in the direction 706 also moves the body 606 in the direction 706, and movement of the bar 704 along or in the direction 708 also moves the body 606 in the direction 708.

In operation, the location of the body 606 can move in either direction 706, 708 to change a tension in the belt 418. For example, the bar 704 and the body 606 may move in the direction 706 to add tension to the belt 418 and make the belt 418 tighter on the auxiliary shaft 420, the auxiliary shaft 414, and the body 606. Conversely, the bar 704 and the body 606 may move in the opposite direction 708 to reduce tension to the belt 418 and loosen the belt 418 off the auxiliary shaft 420, the auxiliary shaft 414, and the body 606. The tensioner device 604 may be used to loosen the belt 418 to replace the belt 418 without having to disassemble other components of the engine system 300 and/or the gearbox assembly 306.

Also shown in FIG. 6 is a rotatable receptacle 608 in the housing 402 of the gearbox assembly 306. The rotatable receptacle 608 can be a ring or other annulus (curved as shown in the illustrated embodiment or having one or more flat surfaces) that rotates within the housing 402 and relative to the housing 402. For example, the rotatable receptacle 608 can rotate around or about the axis 412. An outer surface of the rotatable receptacle 608 that is inside the housing 402 of the gearbox assembly 306 can include teeth, grooves, ridges, or the like, that mate with the teeth, grooves, ridges, or the like, of one or more of the interconnected gears 404 in the housing 402 of the gearbox assembly 306. Rotation of the receptacle 608 can be translated into rotation of the auxiliary shaft 414 in one embodiment.

The receptacle 608 has internal grooves 610 separated by ridges along an inner surface of the receptacle 608 in the illustrated embodiment of the gearbox assembly 306. Alternatively, the receptacle 608 may not include the grooves 610 or may include other surface features. The surface features (e.g., the grooves 610 in the illustrated embodiment) of the receptacle 608 mate with corresponding surface features of the engine coupler 410 and/or the alternator coupler 500 such that rotation of the engine coupler 410 also rotates the alternator coupler 500, as described below.

Figure 9:
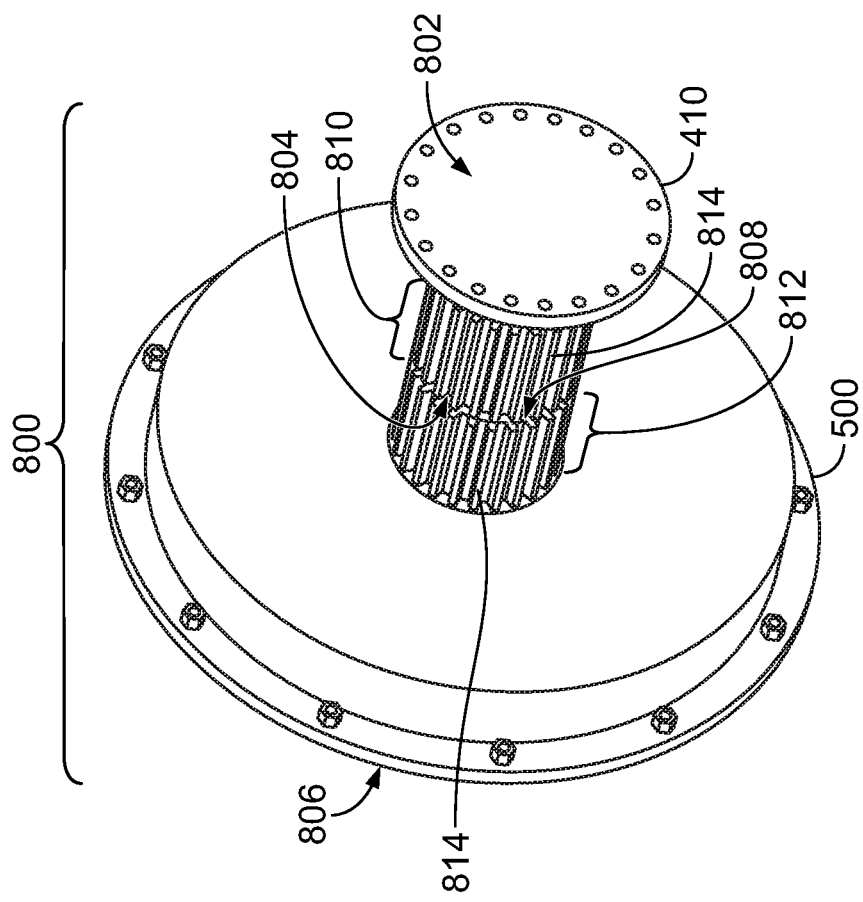
FIG. 9 illustrates another perspective view of the shaft assembly shown in FIG. 8.
Figure 8:
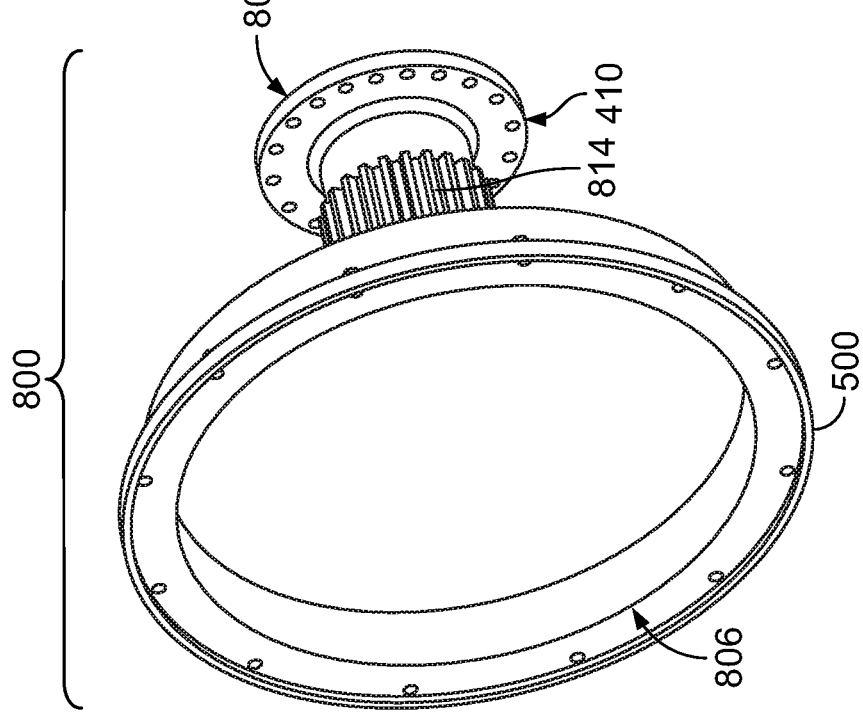
FIG. 8 illustrates a perspective view of a shaft assembly according to one embodiment of the inventive subject matter.

FIG. 8 illustrates a perspective view of a shaft assembly 800 according to one embodiment of the inventive subject matter. FIG. 9 illustrates another perspective view of the shaft assembly 800 shown in FIG. 8. The shaft assembly 800 is formed from a combination of the engine coupler 410 and the alternator coupler 500. The engine coupler 410 extends from an engine interface side or surface 802 to an opposite interior side or surface 804. The alternator coupler 500 extends from an alternator interface side or surface 806 to an opposite interior side or surface 808. The engine interface side 802 of the engine coupler 410 faces and can be interconnected with the engine 302, while the alternator interface side 806 of the alternator coupler 500 faces and can be interconnected with the alternator 104. The sides 804, 808 of the couplers 410, 500 face each other.

The engine coupler 410 and the alternator coupler 500 are not fixed to each other in one embodiment. For example, the engine coupler 410 and the alternator coupler 500 can be separate pieces or bodies that are not connected, adhered, or otherwise fixed to each other. The engine coupler 410 can be at least partially inserted into the rotatable receptacle 608 (shown in FIG. 6) of the housing 402 of the gearbox assembly 306. For example, the side 804 of the engine coupler 410 can be inserted into the rotatable receptacle 608 via or through the engine facing side 406 of the housing 402 of the gearbox assembly 306 (shown in FIG. 4). The alternator coupler 500 also can be at least partially inserted into the rotatable receptacle 608 of the housing 402 of the gearbox assembly 306. For example, the side 808 of the alternator coupler 500 can be inserted into the rotatable receptacle 608 via or through the alternator facing side 408 of the housing 402 of the gearbox assembly 306 (shown in FIG. 4).

The couplers 410, 500 can be inserted into the receptacle 608 of the housing 402 without the sides 804, 808 of the couplers 410, 500 abutting, touching, or otherwise engaging each other. There may be a spatial or air gap between the sides 804, 808 of the couplers 410, 500 inside the receptacle 608. Alternatively, the sides 804, 808 of the couplers 410, 500 can abut, touch, or otherwise engage each other in the receptacle 608 such that there is no spatial or air gap between the sides 804, 808 of the couplers 410, 500.

The couplers 410, 500 can be inserted into the receptacle 608 of the gearbox assembly 306 to reduce the size of the gearbox assembly 306. The available space between the engine 302 and the alternator 104 may be limited and small. Inserting the couplers 410, 500 into the receptacle of the gearbox assembly 306 can reduce the largest size of the gearbox assembly 306 in a direction that extends from the engine 302 to the alternator 104.

Each of the couplers 410, 500 includes a splined shaft 810, 812. The splined shafts 810, 812 extend from the respective sides 804, 808 toward the corresponding opposite sides 802, 806 of the couplers 410, 500. For example, the splined shaft 810 of the engine coupler 410 can include outwardly or radially protruding ridges or teeth 814 that extend from the side 804 toward (but not all the way to) the engine facing side 802 of the engine coupler 410. The splined shaft 812 of the alternator coupler 500 can include outwardly or radially protruding ridges or teeth 814 that extend from the side 808 toward (but not all the way to) the alternator facing side 806 of the alternator coupler 500.

The teeth or ridges 814 of the splined shafts 810, 812 are sized to mesh with the grooves 610 in the rotatable receptacle 608. For example, the width, height, and/or pitch of the teeth or ridges 814 can match the depth, length, and/or pitch of the grooves 610 in the receptacle 608. The teeth or ridges 814 of the splined shafts 810, 812 engage the grooves 610 in the receptacle 608 so that rotation of the engine coupler 410 by the engine shaft also rotates the receptacle 608 in the housing 402 of the gearbox assembly 306. The rotation of the receptacle 608 also rotates the alternator coupler 500. The rotation of the alternator coupler 500 rotates the rotor of the alternator 104.

Figure 10:
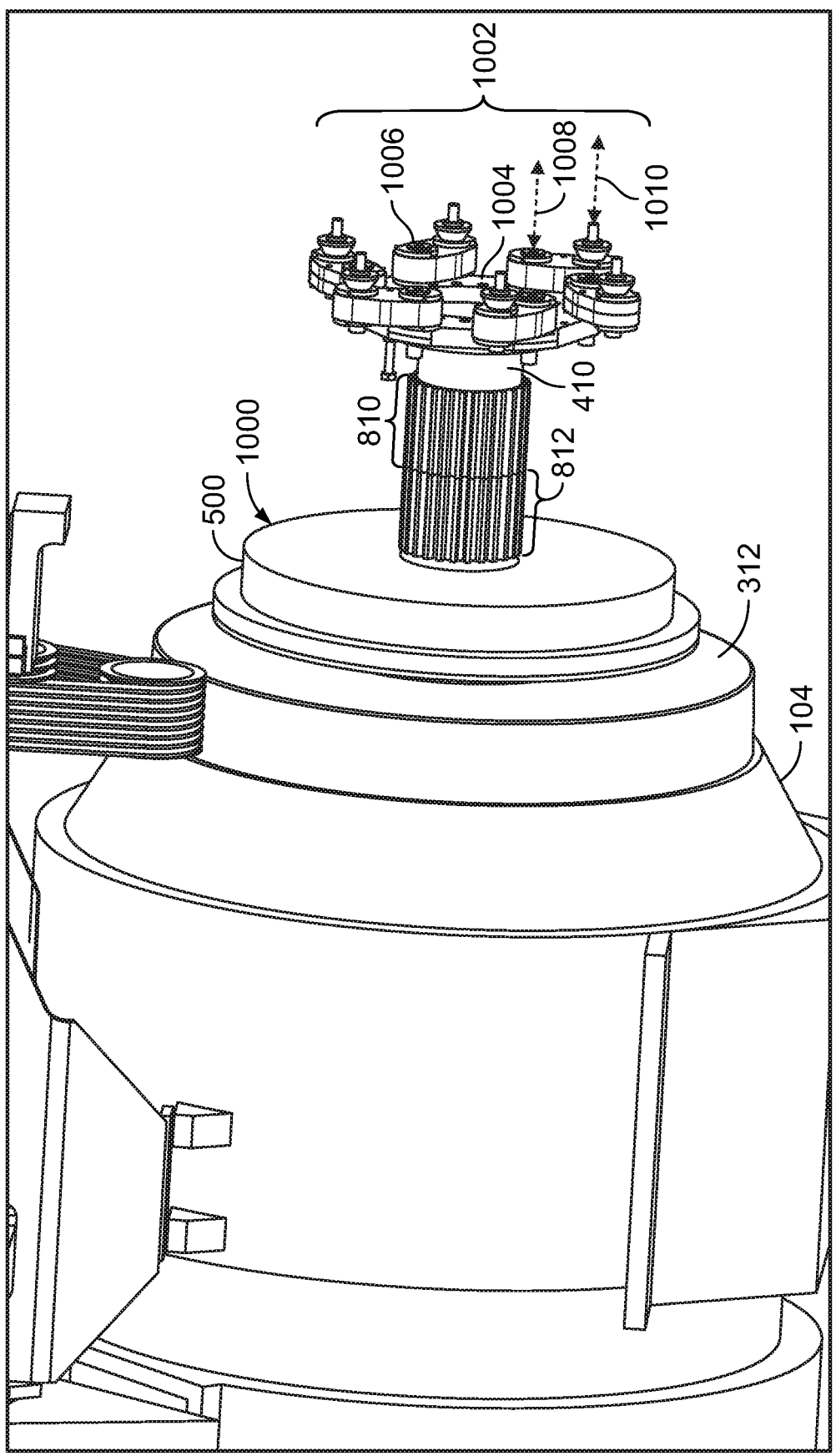
FIG. 10 illustrates a side view of the shaft assembly shown in FIG. 8 coupled with an alternator shown in FIG. 1 according to one embodiment of the inventive subject matter described herein.

FIG. 10 illustrates a side view of the shaft assembly 800 coupled with the alternator 104 according to one embodiment of the inventive subject matter described herein. The gearbox assembly 306 is not shown in FIG. 10. The alternator coupling 500 includes a circular plate 1000 that couples with one end of the alternator 104. For example, the plate 1000 of the alternator coupling 500 may connect with the rotor 312 of the alternator 104. The splined shafts 810, 812 of the engine coupler 410 in the alternator coupler 500 are disposed within the splined receptacle 608 of the gearbox assembly 306 shown in FIG. 6. In the illustrated embodiment, the ends of the splined shafts 810, 812 engage each other, but alternatively maybe separated by an air or spatial gap, as described above.

The circular plate 1000 of the alternator coupler 500 is rigidly coupled with the splined shaft 812 of the alternator coupler 500 in the illustrated embodiment. As a result, rotation of the splined shaft 812 caused by rotation of the grooved inner surface of the receptacle 608 and the gearbox assembly 306 shown in FIG. 6 also rotates the circular plate 1000 of the alternator coupler 500. As described herein, this rotates the rotor 312 of the alternator 104 to create electric current.

The engine coupler 410 also includes a circular plate 1004 that is coupled with the splined shaft 810 of the engine coupler 410. In the illustrated embodiment, the plate 1004 of the engine coupler 410 is smaller than the plate 1000 of the alternator coupler 500. For example, the circumference, radius, diameter, surface area, or the like, of the plate 1004 of the engine coupler 410 is smaller than the corresponding circumference, radius, diameter, surface area, or the like, of the plate 1000 of the alternator coupler 500. The plate 1004 also may be rigidly coupled with the splined shaft 810 of the engine coupler 410 such that rotation of the plate 1004 by rotation of the engine shaft also rotates the splined shaft 810 of the engine coupler 410.

Figure 16:
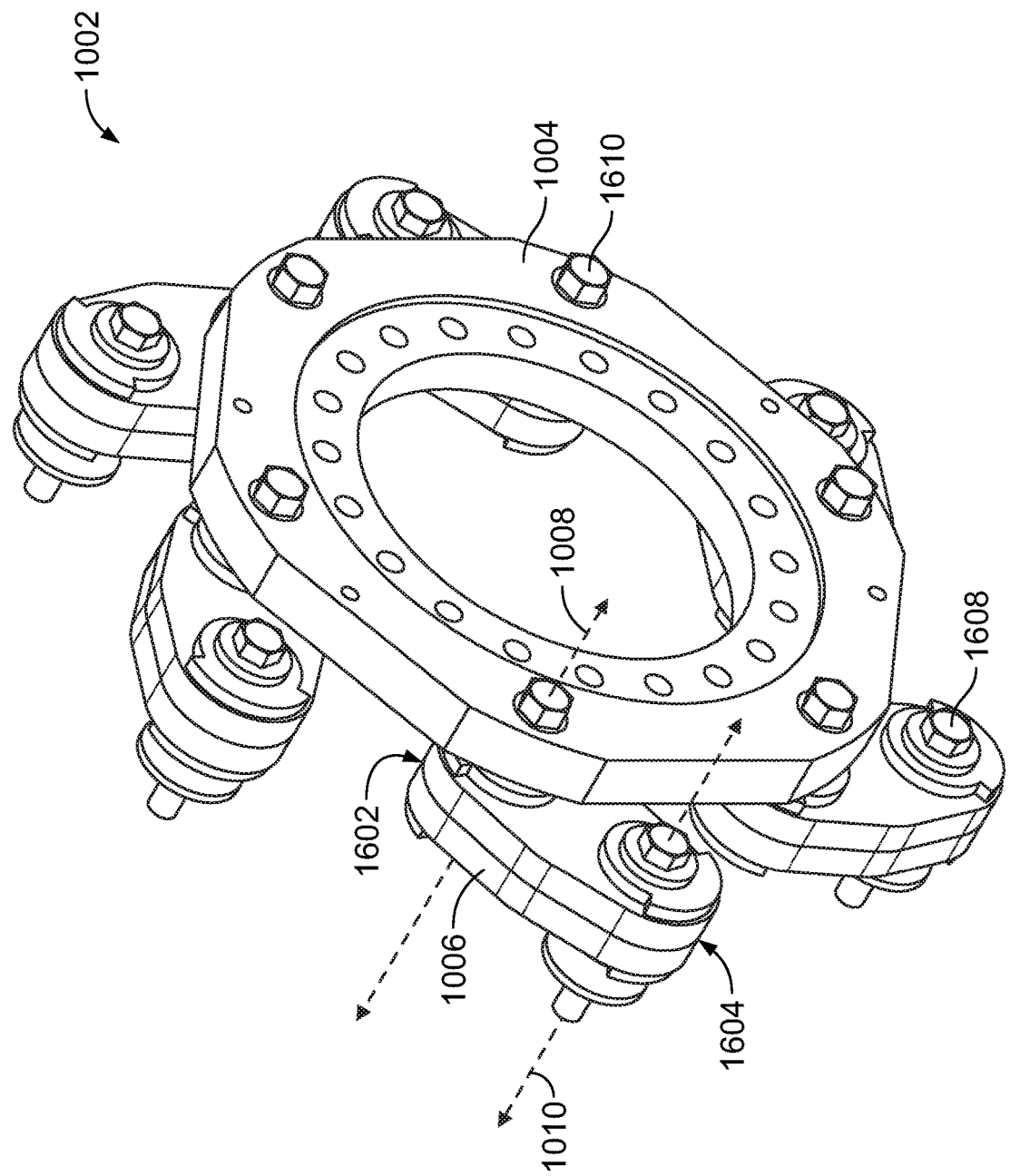
FIG. 16 illustrates a perspective view of the isolation coupling shown in FIG. 10.
Figure 18:
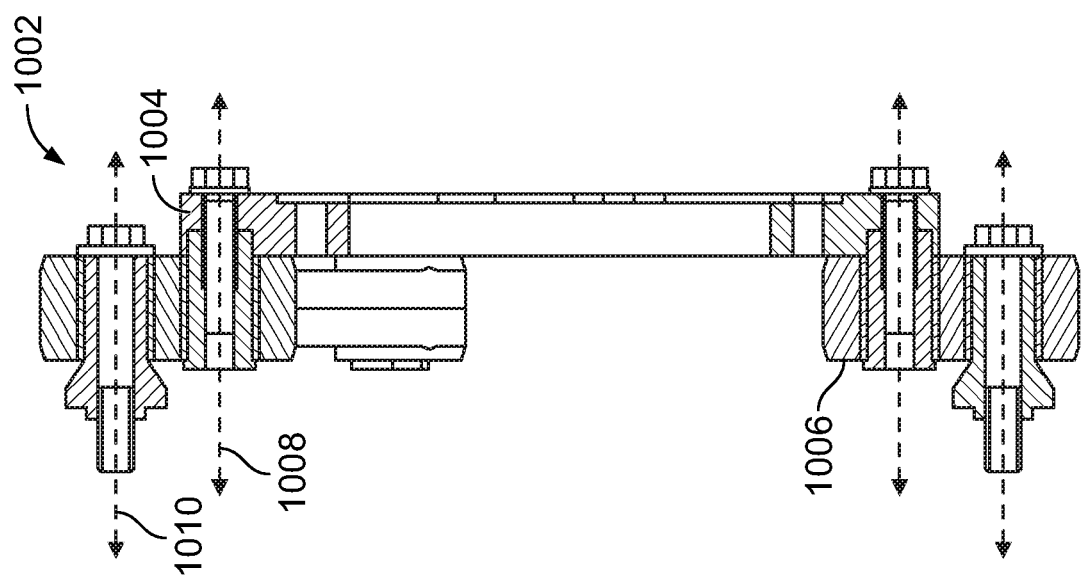
FIG. 18 illustrates a cross-sectional view of the isolation coupling shown in FIG. 10.
Figure 17:
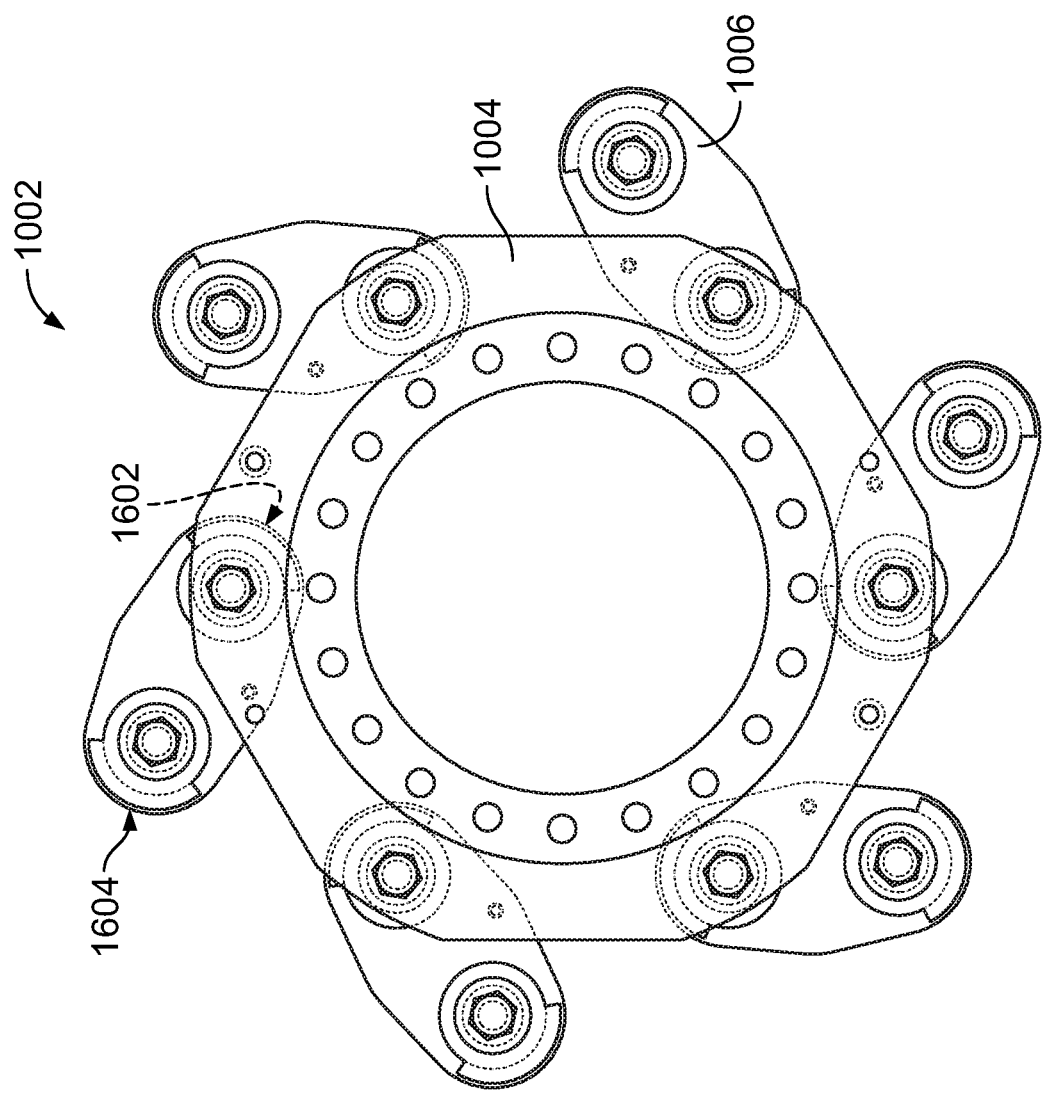
FIG. 17 illustrates a front view of the isolation coupling shown in FIG. 10.

A flexible isolation coupling 1002 can be connected with the plate 1004 of the engine coupler 410. With continued reference to FIG. 10, FIG. 16 illustrates a perspective view of the isolation coupling 1002, FIG. 17 illustrates a front view of the isolation coupling 1002, and FIG. 18 illustrates a cross-sectional view of the isolation coupling 1002. The isolation coupling 1002 interconnects the flywheel 310 and the shaft with the engine coupler 410. The isolation coupling 1002 includes an annular plate 1004 that is coupled with several elongated flexible bodies 1006. These flexible bodies 1006 can be formed from one or more dielectric materials to electrically isolate the flywheel 310 and engine shaft from the engine coupler 410. For example, the elongated flexible bodies 1006 can be formed from rubber or the like to prevent electric current in the flywheel 310 from being conducted into the engine coupler 410. Alternatively, the bodies 1006 may not be flexible and/or may be formed from another material.

The elongated bodies 1006 can be flexible to absorb vibrations, translations, torsional variations, or the like, in the flywheel 310. The elongated bodies 1006 extend between opposite ends 1602, 1604, with one end 1602 rotatably mounted or coupled with the plate 1004 of the engine coupler 410, and the opposite end 1604 rotatably mounted or coupled with the flywheel 310 of the engine 302. In the illustrated embodiment, the ends of the elongated bodies 1006 are connected with the circular plate 1004 of the engine coupler 410 at different locations along, at, or near an outer circumference of the circular plate 1004 on the side of the plate 1004 that faces the engine 302.

The elongated bodies 1006 may be rotatably coupled with the plate 1004 such that each of the elongated bodies 1006 can individually and/or separately rotate about or around different axis of rotation 1008, with each of the axes of rotation 1008 of the elongated bodies 1006 being parallel to the axis of rotation 412 and/or the center axis of the engine shaft. For example, bolts or other fasteners 1610 can be inserted in one end of the elongated bodies 1006 that couples with circular plate 1004 of the engine coupler 410.

The opposite end 1604 of each of the elongated bodies 1006 may include a similar coupling to the flywheel 310. For example, a bolt or other fastener 1608 may be inserted through a hole or other opening in the opposite end of the elongated bodies 1006 such that each elongated body 1006 is rotatably coupled with the flywheel 310. This other rotatable coupling of each elongated body 1006 allows each elongated body 1006 with the potential for rotating about or around another axis of rotation 1010.

The ends 1602, 1604 of each elongated body 1006 may therefore be rotatably coupled with both the engine coupler 410 and the flywheel 310. While the engine 302 is running (e.g., the engine 302 is rotating the flywheel 310 via rotation of the engine shaft), the elongated bodies 1006 are in tension. For example, the ends 1604 of the elongated bodies 1006 may be pulled by the flywheel 310 as the flywheel 310 rotates. The opposite ends 1602 of the elongated bodies 1006 are pulled in a rotational path by rotation of the ends 1604 by the flywheel 310. As the ends 1602 of the elongated bodies 1006 are pulled along the rotational path, the plate 1004 is rotated, which rotates the coupler 410 (as the coupler 410 is connected with the plate 1004).

The multiple axes of rotation 1008, 1010 of each elongated body 1006 and the formation of the elongated bodies 1006 from a resilient material (e.g., rubber) can allow for vibrations, translations, torsional variations, or other movements of the shaft of the resiliently mounted engine 302 to be absorbed by the elongated bodies 1006 and not prevent or interfere with operation of the rigidly mounted gearbox assembly 306 and/or the rigidly mounted alternator 104. For example, the engine 302 and corresponding shaft may vibrate vertically and horizontally other linear directions, the shaft of the engine 302 may radially vibrate and/or, or the like. These movements may be at least partially absorbed by the flexible isolation coupling 1002 that interconnects the resiliently mounted engine 302 with the rigidly mounted gearbox assembly 306.

Figure 11:
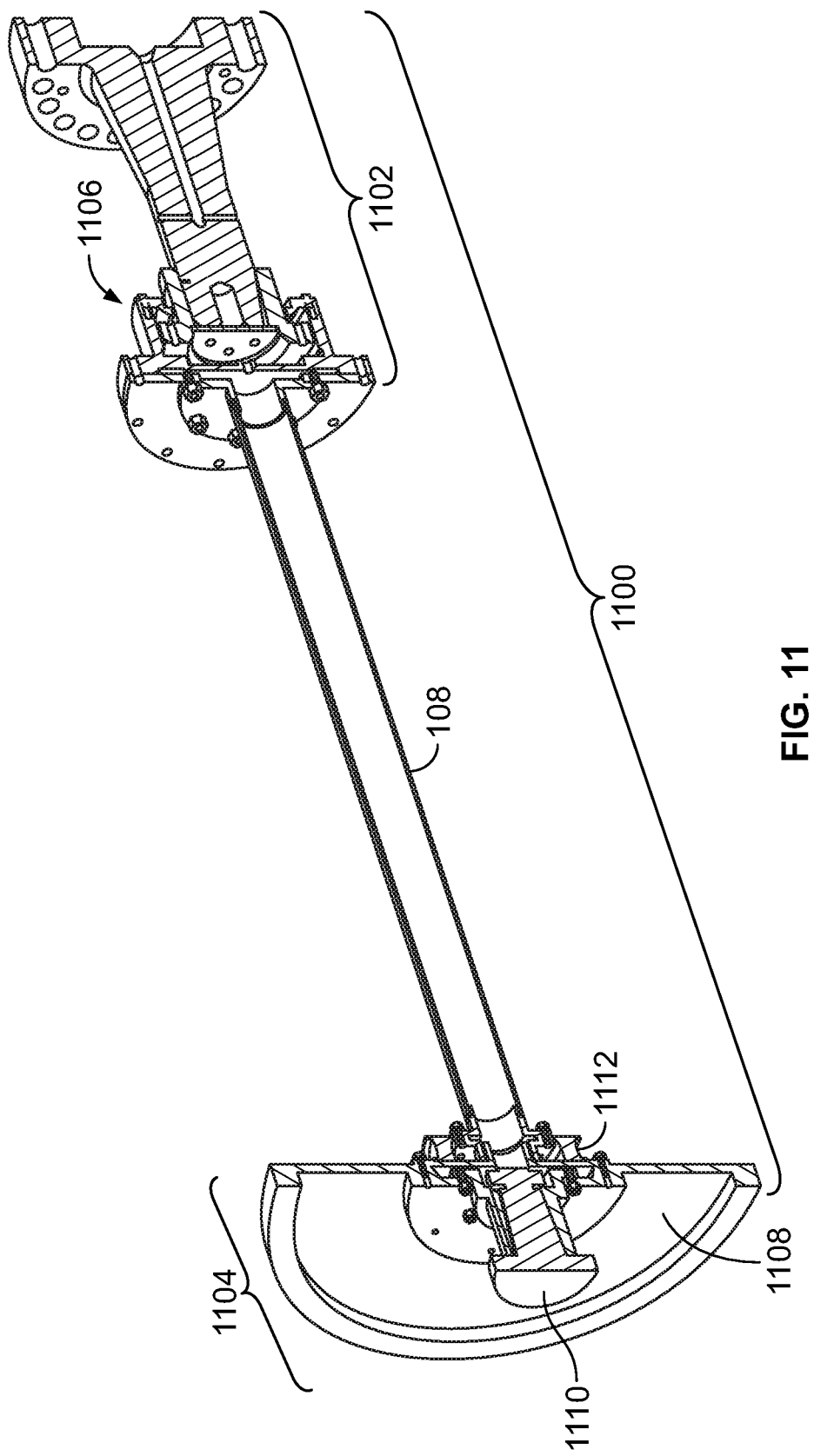
FIG. 11 illustrates a cross-sectional view of a flexible coupling assembly according to one embodiment of the inventive subject matter.

FIG. 11 illustrates a cross-sectional view of a flexible coupling assembly 1100 according to one embodiment of the inventive subject matter. The flexible coupling assembly 1100 may be used to connect the shaft 108 with the engine 302 and the compressor 106. As described above, the engine 302 may be resiliently mounted while the compressor or other component 106 is rigidly mounted. Therefore, similar to the combination of the engine 302 and the alternator 104, a flexible coupling can be provided between the engine 302 and the compressor 106 to ensure that vibrations, movements, torsional variations, and the like, of the engine 302 do not interfere with or prevent operation of the compressor 106.

The flexible coupling assembly 1100 includes an engine interface assembly 1102 and an end coupling assembly 1104. As shown in FIG. 11, the assemblies 1102, 1104 are disposed on opposite ends of the shaft as the shaft 108 may be a rigid shaft that is formed from one or more rigid materials. The engine interface assembly 1102 may be at least partially disposed in or otherwise coupled with the engine 302. The engine coupling assembly 1102 may include one or more gears 1106 that connect the shaft 108 with the shaft of the engine 302. These gears 1106 can correct or take up radial, angular, and/or axial misalignment between the shaft 108 and the engine 302.

The end coupling assembly 1104 includes a flywheel 1108 on an end of the shaft 108 that is opposite the engine coupling assembly 1102. A connector 1110 on the end coupling assembly 1104 may be connected with the compressor 106 to transfer rotation of the shaft 108 to the compressor 106. The flywheel 1108 is disposed between this connector 1110 and the shaft 108. The flywheel 1108 can absorb variations in the rotational speed and/or momentum of the shaft 108 created by the engine 302.

The end coupling assembly 1104 also includes a flexible disk coupler 1112. The flexible disk coupler 1112 may be formed from one or more flexible materials, such as rubber. The flexible disk coupler 1112 may absorb vibrations, movements, torsional variations, or the like in the compressor shaft 108. The flexible disk coupler 1112 can allow for the rigid compressor shaft 108 that is rigidly coupled by the engine coupling assembly 1102 to the resiliently mounted engine 302 to absorb the vibrations, torsional variations, or other movements of the engine 302 and compressor shaft 108 so as to allow the rigidly mounted compressor 106 to be powered by rotation of the compressor shaft 108.

Figure 12:
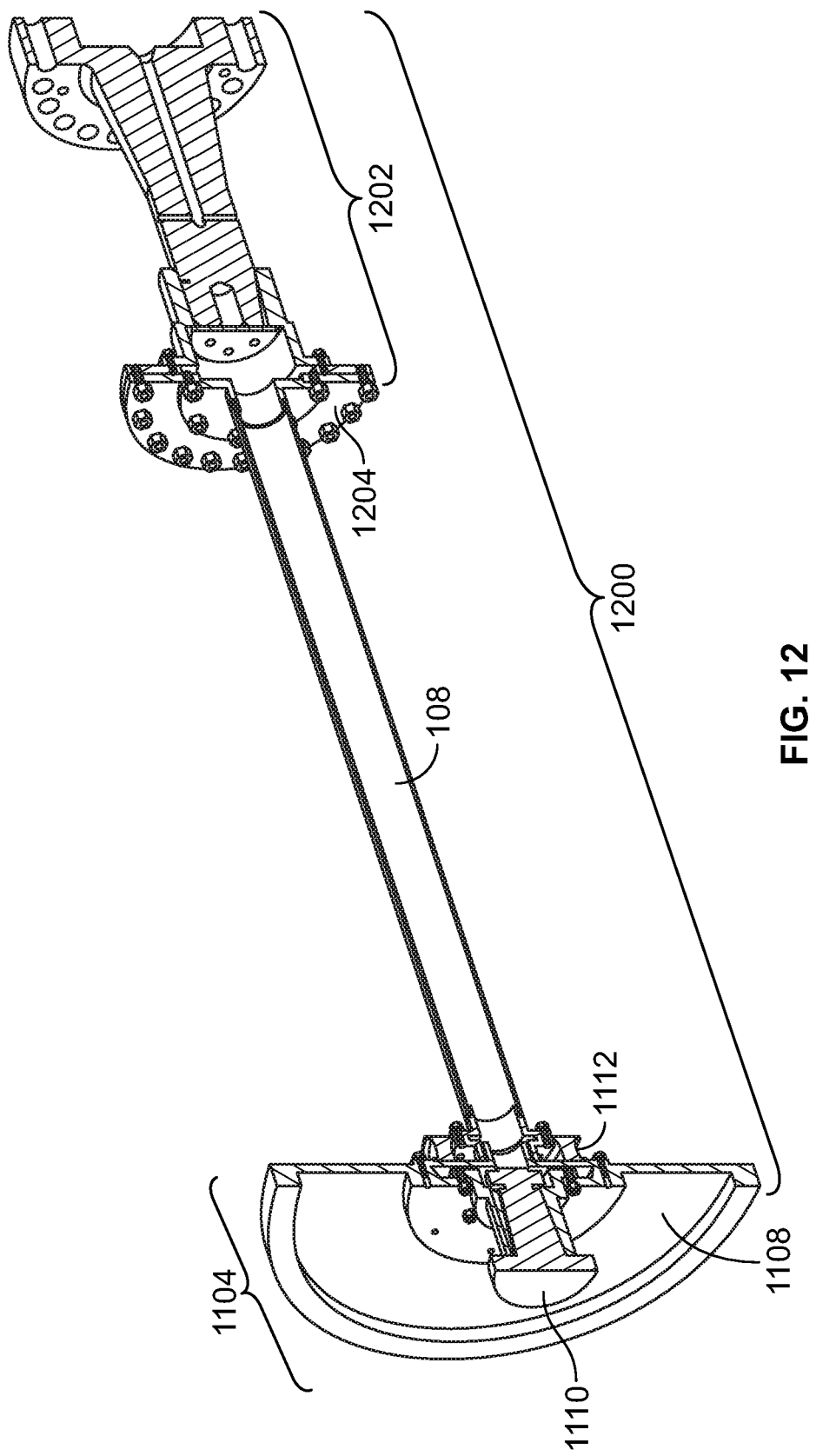
FIG. 12 illustrates a cross-sectional view of a flexible coupling assembly according to another embodiment of the inventive subject matter.

FIG. 12 illustrates a cross-sectional view of a flexible coupling assembly 1200 according to another embodiment of the inventive subject matter. The flexible coupling assembly 1200 may be used to connect the shaft 108 with the engine 302 and the compressor 106. As described above, the engine 302 may be resiliently mounted while the compressor or other component 106 is rigidly mounted. Therefore, similar to the combination of the engine 302 and the alternator 104, a flexible coupling can be provided between the engine 302 and the compressor 106 to ensure that vibrations, movements, torsional variations, and the like, of the engine 302 do not interfere with or prevent operation of the compressor 106.

The flexible coupling assembly 1200 includes the end coupling assembly 1104 described above and an engine interface assembly 1202. As shown in FIG. 11, the assemblies 1202, 1104 are disposed on opposite ends of the compressor shaft 108. The engine interface assembly 1202 may be at least partially disposed in or otherwise coupled with the engine 302. In contrast to the engine coupling assembly 1102, the engine coupling assembly 1202 may not be coupled with the shaft of the engine 302 by gears. Instead, the engine coupling assembly 1202 includes a flexible, circular plate 1204 that connects the shaft of the engine 302 with the compressor shaft 108.

Similar to the flexible disk coupler 1112 of the end coupling assembly 1104, the flexible plate 1204 may be formed from one or more flexible materials that absorb vibrations, movements, torsional variations, or the like, in the compressor shaft 108. The flexible plate 1204 can allow for the rigid compressor shaft 108 that is rigidly coupled by the engine coupling assembly 1102 to the resiliently mounted engine 302 to absorb the vibrations, torsional variations, or other movements of the engine 302 and compressor shaft 108 so as to allow the rigidly mounted compressor 106 to be powered by rotation of the compressor shaft 108.

Figure 13:
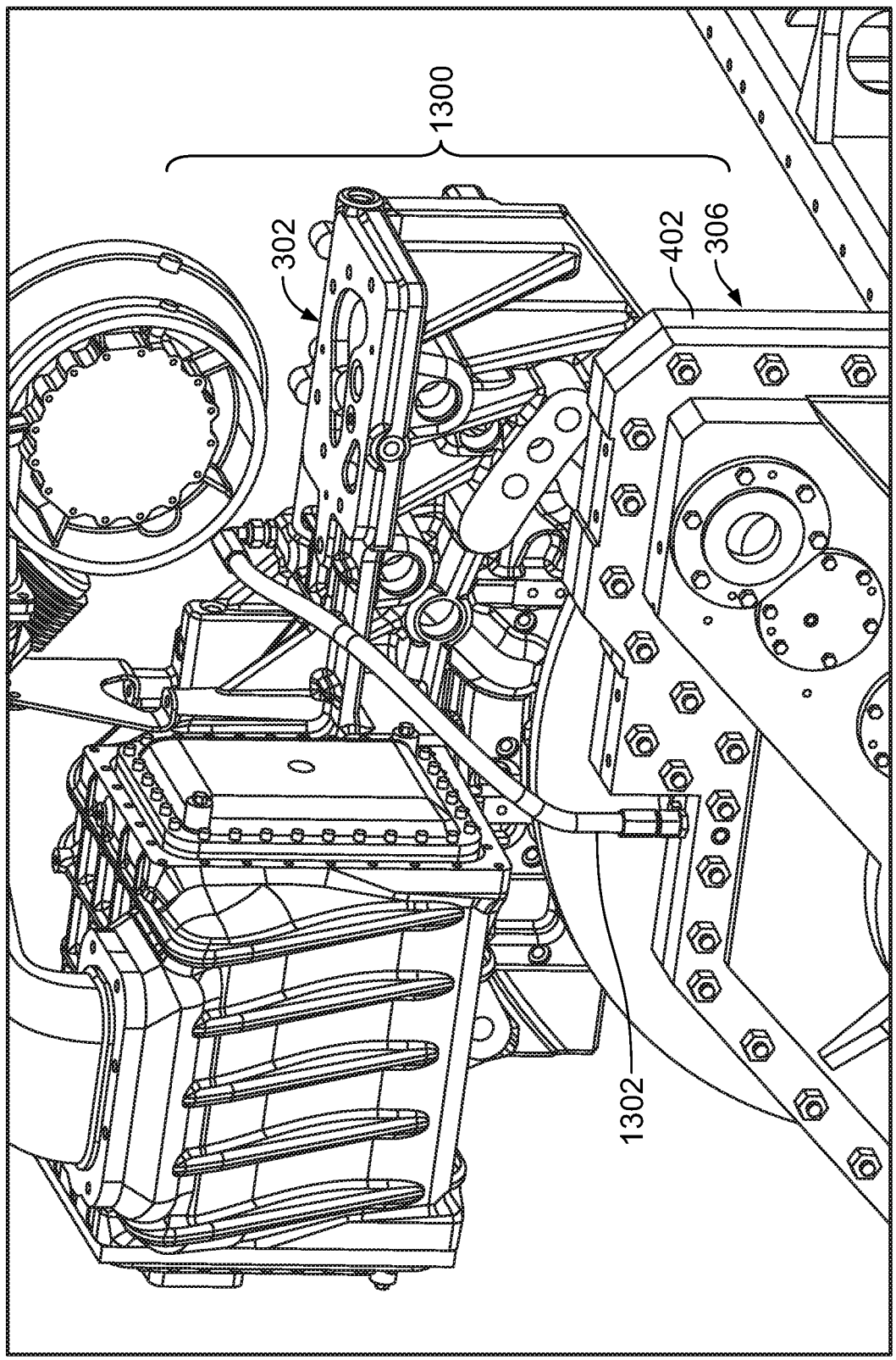
FIG. 13 illustrates a perspective view of a closed loop lubrication system according to one embodiment of the inventive subject matter described herein.

FIG. 13 illustrates a perspective view of a closed loop lubrication system 1300 according to one embodiment of the inventive subject matter described herein. The closed-loop lubrication system 1300 circulates or recirculates lubricant in the engine 302 with lubrication circuit of the engine 302 into the internal chamber of the gearbox assembly 306 and back into the lubrication system circuit of the engine 302. The liquid lubrication circuit of the engine 302 includes the conduits, chambers, directions of flow, or the like, that define where the lubricant flows through different components of the engine 302 to lubricate the moving parts of the engine 302.

In FIG. 13, only a portion of the back end of the engine 302 is shown. An inlet conduit 1302 is fluidly coupled with one or more interior chambers conduits in the engine 302 where lubricant, such as oil, is present. This conduit 1302 also may be connected with the outer housing 402 of the gearbox assembly 306 and may be fluidly coupled with the interior chamber of the gearbox assembly 306. This inlet conduit 1302 may be a hose or other fluid connection that directs lubricant in the engine 302 to flow out of the engine 302, through the conduit 1302, and into the interior chamber or chambers of the housing 402 of the gearbox assembly 306. In one embodiment, the inlet conduit 1302 is coupled with the engine 302 in a location downstream of where the lubricant is filtered and/or cooled. This can allow for the lubricant to be directed directly from the engine 302 into the gearbox assembly 306 without the need for an additional filter and/or cooling system to clean and cool the lubricant.

Figure 14:
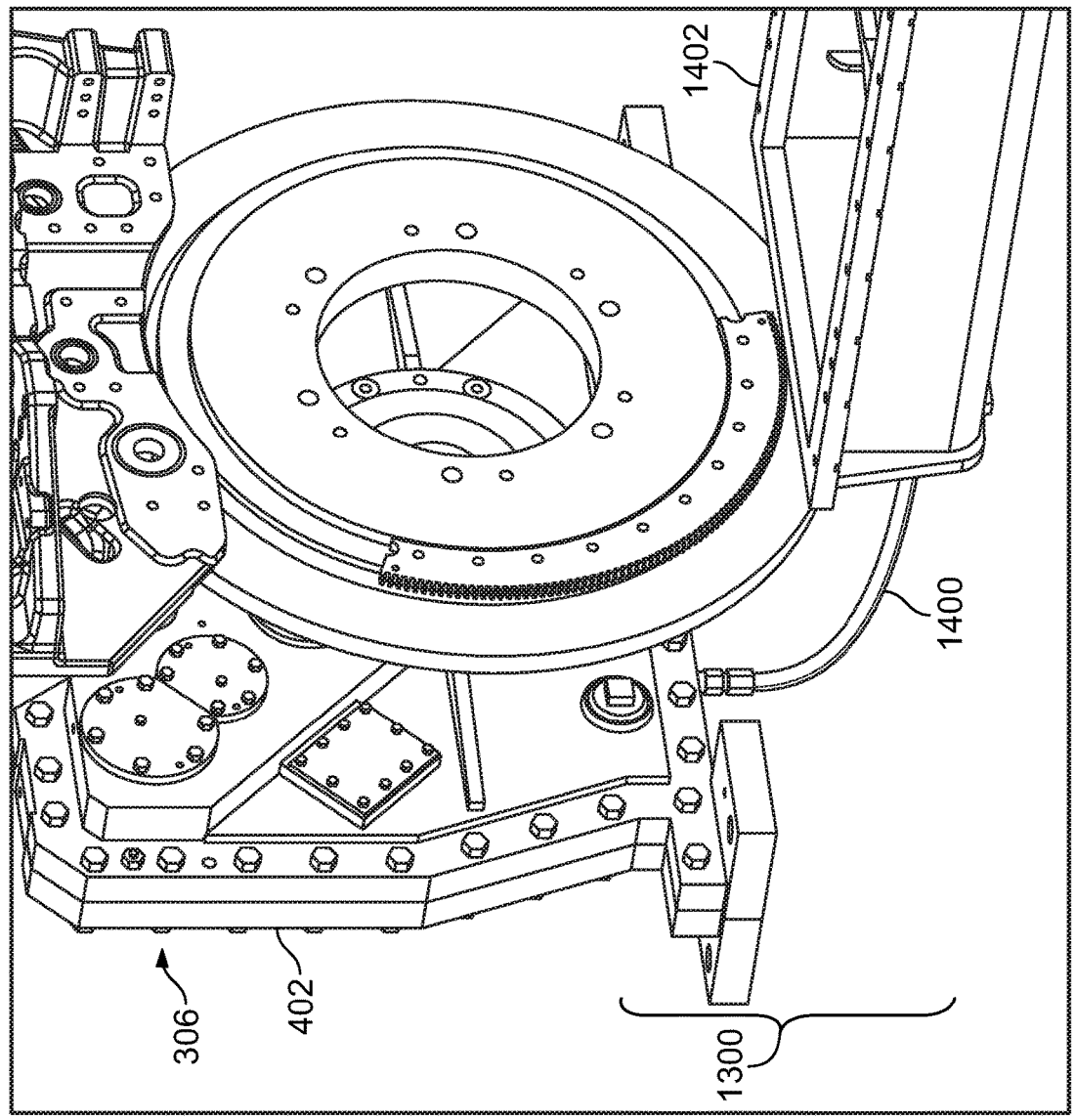
FIG. 14 illustrates a perspective view of another portion of the closed-loop lubrication system shown in FIG. 13.

The lubricant flows from the engine 302 into the gearbox assembly 306 to lubricate the interconnected gears 404 and/or other moving components within the gearbox assembly 306. FIG. 14 illustrates a perspective view of another portion of the closed-loop location system 1300 shown in FIG. 13. As shown in FIG. 13, the inlet conduit 1302 fluidly couples the lubrication circuit of the engine 302 with a top or upper portion of the housing 402 of the gearbox assembly 306. This can allow for gravity to assist in distributing lubricant throughout the interior portions of the housing 402 of the gearbox assembly 306. Similarly, a bottom surface or portion of the housing 402 of the gearbox assembly 306 can include an outlet conduit 1400 that is coupled with the housing 402 and the fluidly coupled with the interior chamber or chambers of the housing 402 of the gearbox assembly 306.

After flowing or passing through the interior of the housing 402 of the gearbox assembly 306, the lubricant may flow out of the gearbox assembly 306 via an outlet conduit 1400. This lubricant can pass through the outlet conduit 1400 into a portion of the lubrication circuit of the engine 302 such as a lubricant reservoir 1402 of the lubrication circuit of the engine 302. The lubricant reservoir 1402 can hold the lubricant until it is drawn out of the reservoir 1402 and back into the engine 302. In this way, the closed-loop lubrication system 1300 allows for the lubricant in the engine 302 to be used to lubricate moving components of the gearbox assembly 306 without needing an additional source of the lubricant, without needing an additional filter for cleaning the lubricant, and/or without needing an additional cooling system for reducing temperatures of the lubricant. The lubrication system 1300 allows for the gearbox assembly 306 to draw only a portion of the lubricant in the engine 302 to the gearbox assembly 306. This can ensure that the engine 302 has sufficient lubricant to continue operating safely, while also providing lubricant to assist with the smooth operation of the gearbox assembly 306.

Figure 15:
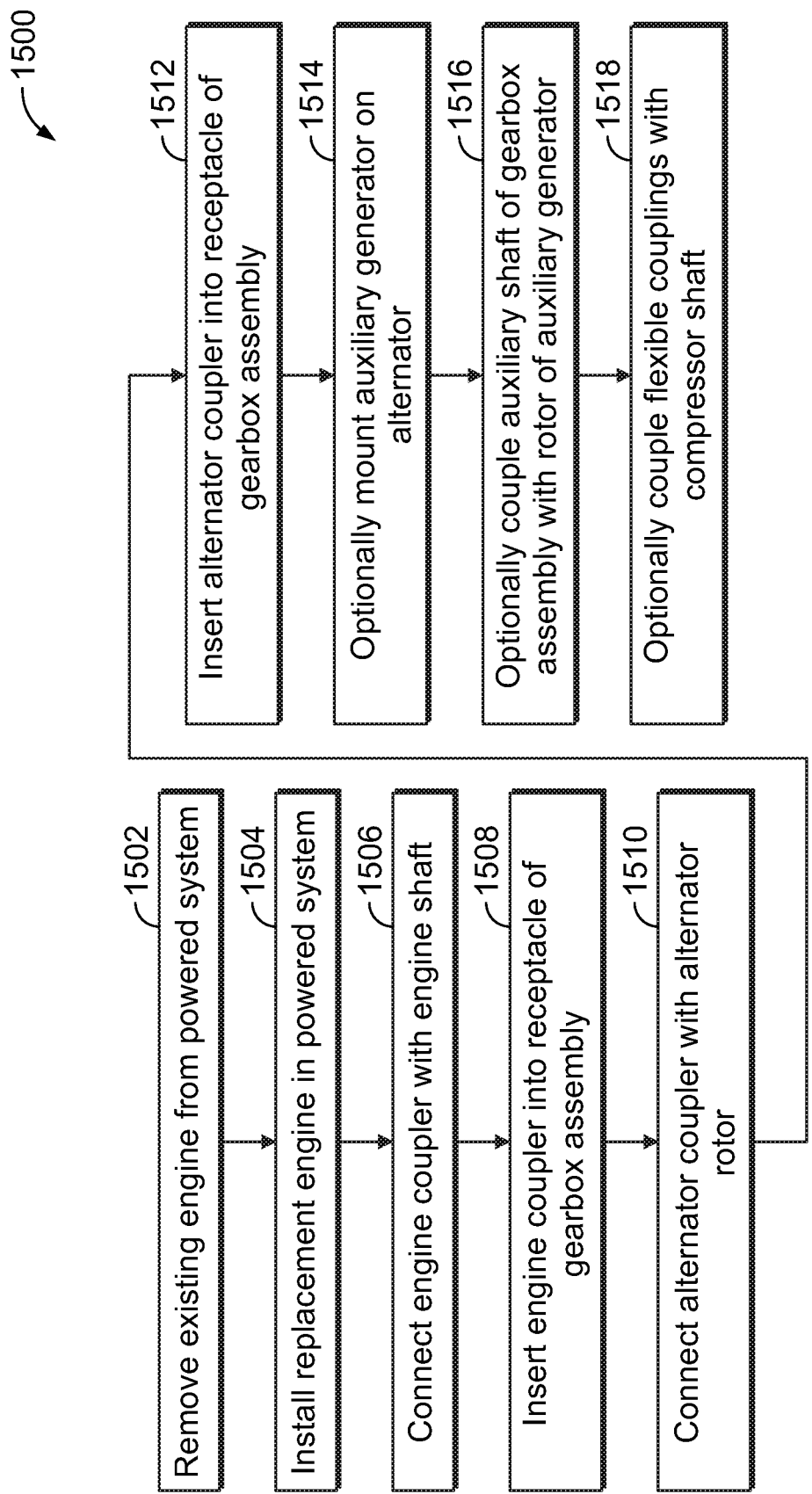
FIG. 15 illustrates a flowchart of one embodiment of a method for replacing an engine of a powered system.

FIG. 15 illustrates a flowchart of one embodiment of a method 1500 for replacing an engine of a powered system. The method 1500 can be used to replace a rigidly mounted engine 102 in the powered system 100 with the resiliently mounted engine 302, while absorbing or otherwise accounting for vibrations, torsional variations, or other movements of the resiliently mounted engine 302 relative to other rigidly mounted components, such as the alternator 104 and the compressor 106.

At 1502, the existing or pre-existing engine in the powered system is removed. For example, the rigidly mounted engine 102 may be detached from the powered system 100, including detaching the engine 102 from the platform 110, the alternator 104, and the compressor 106. At 1504, the replacement engine is installed in the powered system. For example, the resiliently mounted engine 302 may be coupled to the platform 110 of the powered system 100 using resilient bodies 304 that allow some minor movement of the engine 302 relative to the platform 110.

At 1506, an engine coupler is connected with the shaft of the engine. For example, the flexible isolation coupling 1002 of the engine coupler 410 may be bolted or otherwise coupled with the shaft of the engine 302. At 1508, the engine coupler is inserted into the rotatable receptacle of the gearbox assembly. For example, the splined shaft 810 of the engine coupler 410 can be inserted part of the way into the grooved receptacle 608 of the gearbox assembly 306. The splined shaft 810 of the engine coupler 410 may be inserted into the receptacle 608 such that the end 804 of the splined shaft 810 is located inside the receptacle 608 in a location that is between the engine side 406 of the housing 402 of the gearbox assembly and the alternator side 408 of the housing 402 of the gearbox assembly 306.

At 1510, an alternator coupler is connected with a rotor of the alternator. For example, the alternator coupler 500 may be bolted or otherwise connected with the rotor of the alternator 104. The side 806 of the alternator coupler 500 may be connected with the rotor of the alternator 104 such that rotation of the alternator coupler 500 also rotates the rotor of the alternator 104.

At 1512, the alternator coupler is inserted into the receptacle of the gearbox assembly. For example, the splined shaft 812 of the alternator coupler 500 may be inserted into the grooved receptacle 608 of the gearbox assembly 306. This splined shaft 812 may be inserted into the receptacle 608 such that the end 808 of the splined shaft 812 extends part of the way into the receptacle 608 and is disposed at a location that is between the alternator side 408 of the housing 402 the gearbox assembly 306 and the engine side 406 of the housing 402 of the gearbox assembly 306. In one embodiment, the ends 804, 808 of the splined shafts 810, 812 of the engine coupler 410 and the alternator coupler 500 do not touch each other inside the receptacle 608 and are separated from each other by an air gap or other spatial gap. Alternatively, the ends 804, 808 of the splined shafts 810, 812 of the engine coupler 410 in the alternator coupler 500 may engage, abut, or otherwise touch each other in the receptacle 608 of the gearbox assembly 306.

The order in which the operations 1506, 1508, 1510, 1512 are performed may be different from what is shown in the flowchart of FIG. 15. For example, the engine coupler 410 and/or the alternator coupler 500 may first be inserted into the receptacle 608 of the gearbox assembly 306 before connecting the flexible isolation coupling 1002 of the engine coupler 410 with the shaft of the engine 302 and/or before connecting the side 806 of the alternator coupler 500 with the rotor of the alternator 104.

At 1514, an auxiliary generator or alternator optionally is mounted onto the alternator of the powered system. For example, the mounting bracket 400 can be connected on an exterior surface of the alternator 104 in any of a variety of different locations. An auxiliary alternator or generator 308 can be held by this mounting bracket 400 on the outside of the alternator 104.

At 1516m an auxiliary shaft of the gearbox assembly optionally is coupled with a rotor of the auxiliary generator or alternator. For example, the auxiliary shaft 420 of the gearbox assembly 306 can be coupled with the rotor of the alternator or generator 308. As described above, this can allow for rotation of the engine shaft be translated through the internal gears 404 of the gearbox assembly 306 two rotation of the auxiliary shaft 420 and rotation of the rotor and the alternator or generator 308. The gears 404 of the gearbox assembly 306 can step up the rotational speed of the engine shaft such that rotation of the auxiliary shaft 420 is much faster than the speed of rotation of the shaft of the engine 302.

At 1518, one or more flexible couplings are optionally coupled with the opposite end of the shaft of the engine and the shaft of the compressor. For example, the flexible coupler 1112, such as a ring or other annular body, can be coupled with the end of the compressor shaft 108 is at or near the compressor 106. This flexible coupling 1112 can absorb vibrations, torsional variations, or other movements of the shaft 108 and/or the engine 302 relative to the fixed compressor 106. Optionally, the flexible plate 1204 can be connected to the end of the shaft 108 were near the end of the shaft 108 that is closer to the engine 302. This flexible plate 1204 also can absorb vibrations, torsional variations, and/or other movements of the engine 302 relative to the rigidly mounted compressor 106.

In one embodiment, an engine system includes a gearbox assembly that includes a housing having plural interconnected gears disposed between an engine side of the housing and an alternator side of the housing, a rotatable engine coupler connected with the engine side of the housing, the engine coupler configured to engage a rotatable shaft of an engine, and a rotatable alternator coupler connected with the alternator side of the housing, the alternator coupler configured to engage a rotor of a first alternator. The housing is configured to be positioned between the engine and the first alternator. The engine coupler is configured to engage the engine that is resiliently mounted in the powered system and the alternator coupler is configured to engage the first alternator that is rigidly mounted in the powered system to transfer rotation of the shaft of the engine to rotation of the rotor of the first alternator.

The engine system may be a locomotive engine system in one embodiment, or alternatively may be the engine system for another type of vehicle or a stationary system.

Optionally, the engine is a replacement engine that replaces a previous engine of the powered system.

Optionally, the alternator coupler and the housing are configured to support and radially position the rotor of the alternator.

Optionally, the system also includes an auxiliary rotatable shaft projecting from the housing and configured to interconnect with a rotor of one or more of an auxiliary alternator or an auxiliary generator. The auxiliary rotatable shaft can be coupled with the engine coupler by the interconnected gears in the housing.

Optionally, the auxiliary rotatable shaft projects from the housing in a location to couple with the rotor of the one or more of the auxiliary alternator or the auxiliary generator that is mounted on the first alternator.

Optionally, the interconnected gears in the housing are configured to increase a rotational speed at which the engine coupler is rotated by the shaft of the engine to a faster rotational speed at which the auxiliary rotatable shaft rotates.

Optionally, the auxiliary rotatable shaft is configured to interconnect with the rotor of the one or more of the auxiliary alternator or the auxiliary generator via a belt.

Optionally, the system also includes a tensioner device configured to change tension in the belt.

Optionally, the system also includes a mounting bracket configured to be coupled with the first alternator and with the one or more of the auxiliary alternator or the auxiliary generator to support the one or more of the auxiliary alternator or the auxiliary generator on the first alternator.

Optionally, the mounting bracket also is configured to support the auxiliary rotatable shaft and bearings on which the auxiliary rotatable shaft rotates.

Optionally, the system also includes an inlet conduit coupled with the housing and fluidly coupled with an interior chamber in the housing. The inlet conduit can be configured to be fluidly coupled with a liquid lubrication circuit of the engine. The inlet conduit also can be configured to direct lubricant in the liquid lubrication circuit of the engine into the interior chamber of the housing. The system can include an outlet conduit coupled with the housing and fluidly coupled with the interior chamber in the housing. The outlet conduit can be configured to be fluidly coupled with a lubricant reservoir of the liquid lubrication circuit of the engine. The outlet conduit also can be configured to direct the lubricant in the interior chamber of the housing to the lubricant reservoir of the liquid lubrication circuit of the engine.

Optionally, the system also includes a rotatable receptacle in the housing. The rotatable receptacle can be coupled with the interconnected gears of the housing, and can be configured to interconnect with the shaft of the engine and with the rotor of the alternator to transfer rotation of the shaft of the engine to rotation of the rotor of the alternator.

Optionally, the rotatable engine coupler includes an engine splined shaft configured to mate with the shaft of the engine and to be received in the rotatable receptacle in the housing. The rotatable alternator coupler can include an alternator splined shaft configured to mate with the rotor of the alternator and to be received in the rotatable receptacle in the housing.

Optionally, the rotatable receptacle has internal grooves shaped to mate with ridges on an exterior surface of the engine splined shaft and an exterior surface of the alternator splined shaft.

Optionally, the engine splined shaft and the alternator splined shaft do not abut each other in the rotatable receptacle in the housing.

Optionally, the system also includes a flexible isolation coupling configured to interconnect the shaft of the engine with the rotatable engine coupler.

Optionally, the flexible isolation coupling includes plural elongated flexible bodies disposed along an outer circumference of the rotatable engine coupler. Each of the elongated flexible bodies can be rotatably coupled with the rotatable engine coupler at a first end of the elongated flexible body and is configured to be rotatably coupled with the shaft of the engine at an opposite, second end of the elongated flexible body.

Optionally, the powered system is a vehicle.

Optionally, the system also includes a compressor shaft configured to be coupled with an air compressor and to be rotated by the engine to power the air compressor. The system also can include flexible disc coupler configured to connect the compressor shaft with the shaft of the engine. The flexible disc coupler can be configured to flex and absorb torsional variations in one or more of the compressor shaft, the shaft of the engine, or the rotor of the first alternator.

Optionally, the system also includes a flywheel coupled with the flexible disc coupler. The engine coupler, the alternator coupler, the gearbox assembly, the flexible disc coupler, and the compressor shaft can be configured to flex and absorb the torsional variations in the one or more of the compressor shaft, the shaft of the engine, or the rotor of the first alternator.

In one embodiment, an engine system includes a gearbox assembly that includes a housing having plural interconnected gears disposed between an engine side of the housing and an alternator side of the housing. The housing is configured to be positioned between an engine of a powered system and a first alternator. The engine system also includes rotatable engine coupler connected with the engine side of the housing. The engine coupler configured to engage a rotatable shaft of the engine. The engine system also includes a rotatable alternator coupler connected with the alternator side of the housing. The alternator coupler is configured to engage a rotor of the first alternator. The engine coupler is configured to engage the engine and the alternator coupler is configured to engage the first alternator to transfer rotation of the shaft of the engine to rotation of the rotor of the first alternator. The engine system also includes an auxiliary rotatable shaft projecting from the housing and configured to interconnect with a rotor of one or more of an auxiliary alternator or an auxiliary generator, the auxiliary rotatable shaft coupled with the engine coupler by the interconnected gears in the housing.

Optionally, the engine is a replacement engine of the powered system.

Optionally, the alternator coupler and the housing are configured to support and radially position the rotor of the alternator.

Optionally, the interconnected gears in the housing are configured to increase a rotational speed at which the engine coupler is rotated by the shaft of the engine to a faster rotational speed at which the auxiliary rotatable shaft rotates.

Optionally, the engine coupler is configured to engage the engine that is resiliently mounted in the powered system and the alternator coupler is configured to engage the first alternator that is rigidly mounted in the powered system.

Optionally, the auxiliary rotatable shaft projects from the housing in a location to couple with the rotor of the one or more of the auxiliary alternator or the auxiliary generator that is mounted on the first alternator.

Optionally, the auxiliary rotatable shaft is configured to interconnect with the rotor of the one or more of the auxiliary alternator or the auxiliary generator via a belt.

Optionally, the engine system also includes a tensioner device configured to change tension in the belt.

Optionally, the engine system also includes a mounting bracket configured to be coupled with the first alternator and with the one or more of the auxiliary alternator or the auxiliary generator to support the one or more of the auxiliary alternator or the auxiliary generator on the first alternator.

Optionally, the engine system also includes an inlet conduit coupled with the housing and fluidly coupled with an interior chamber in the housing. The inlet conduit can be configured to be fluidly coupled with a liquid lubrication circuit of the engine. The inlet conduit also can be configured to direct lubricant in the liquid lubrication circuit of the engine into the interior chamber of the housing. The engine system also can include an outlet conduit coupled with the housing and fluidly coupled with the interior chamber in the housing. The outlet conduit can be configured to be fluidly coupled with a lubricant reservoir of the liquid lubrication circuit of the engine. The outlet conduit also can be configured to direct the lubricant in the interior chamber of the housing to the lubricant reservoir of the liquid lubrication circuit of the engine.

Optionally, the engine system also includes a rotatable receptacle in the housing. The rotatable receptacle can be coupled with the interconnected gears of the housing. The rotatable receptacle can be configured to interconnect with the shaft of the engine and with the rotor of the alternator to transfer rotation of the shaft of the engine to rotation of the rotor of the alternator.

Optionally, the rotatable engine coupler includes an engine splined shaft configured to mate with the shaft of the engine and to be received in the rotatable receptacle in the housing. The rotatable alternator coupler can include an alternator splined shaft configured to mate with the rotor of the alternator and to be received in the rotatable receptacle in the housing.

Optionally, the rotatable receptacle has internal grooves shaped to mate with ridges on an exterior surface of the engine splined shaft and an exterior surface of the alternator splined shaft.

Optionally, the engine splined shaft and the alternator splined shaft do not abut each other in the rotatable receptacle in the housing.

Optionally, the engine system also includes a flexible isolation coupling configured to interconnect the shaft of the engine with the rotatable engine coupler.

Optionally, the flexible isolation coupling includes plural elongated flexible bodies disposed along an outer circumference of the rotatable engine coupler. Each of the elongated flexible bodies can be rotatably coupled with the rotatable engine coupler at a first end of the elongated flexible body and can be configured to be rotatably coupled with the shaft of the engine at an opposite, second end of the elongated flexible body.

Optionally, the powered system is a vehicle.

Optionally, the powered system is a locomotive.

Optionally, the engine system also includes a compressor shaft configured to be coupled with an air compressor and to be rotated by the engine to power the air compressor. The engine system also can include a flexible disc coupler configured to connect the compressor shaft with the shaft of the engine, wherein the flexible disc coupler is configured to flex and absorb torsional variations in one or more of the compressor shaft, the shaft of the engine, or the rotor of the first alternator.

Optionally, the engine system also can include a flywheel coupled with the flexible disc coupler. The engine coupler, the alternator coupler, the gearbox assembly, the flexible disc coupler, and the compressor shaft can be configured to flex and absorb the torsional variations in the one or more of the compressor shaft, the shaft of the engine, or the rotor of the first alternator.

In one embodiment, a gearbox assembly includes a housing having plural interconnected gears disposed between an engine side of the housing and an alternator side of the housing. The housing is configured to be positioned between an engine of a powered system and a first alternator to transfer rotation of a shaft of the engine to rotation of a rotor of the first alternator. The assembly also includes a closed loop lubrication system fluidly coupled with an interior chamber inside the housing and configured to be fluidly coupled with a liquid lubrication circuit of the engine. The closed loop lubrication system is configured to direct lubricant in the engine into the interior chamber of the housing and to direct the lubricant exiting the interior chamber back to the liquid lubrication circuit of the engine.

Optionally, the closed loop lubrication system includes an inlet conduit coupled with the housing and fluidly coupled with the interior chamber in the housing. The inlet conduit can be configured to be fluidly coupled with the liquid lubrication circuit of the engine to direct lubricant in the liquid lubrication circuit of the engine into the interior chamber of the housing.

Optionally, the closed loop lubrication system includes an outlet conduit coupled with the housing and fluidly coupled with the interior chamber in the housing. The outlet conduit can be configured to be fluidly coupled with a lubricant reservoir of the liquid lubrication circuit of the engine to direct the lubricant in the interior chamber of the housing to the lubricant reservoir of the liquid lubrication circuit of the engine.

Optionally, the engine to which the housing is configured to couple is a replacement engine that replaces a previous engine of the powered system.

Optionally, the housing is configured to couple with the engine that is resiliently mounted in the powered system and with the first alternator that is rigidly mounted in the powered system to transfer the rotation of the shaft of the engine to rotation of the rotor of the first alternator.

Optionally, the assembly also includes a rotatable engine coupler connected with the engine side of the housing. The engine coupler can be configured to engage a rotatable shaft of the engine. The assembly also can include a rotatable alternator coupler connected with the alternator side of the housing. The alternator coupler can be configured to engage the rotor of a first alternator.

Optionally, the assembly also includes an auxiliary rotatable shaft projecting from the housing and configured to interconnect with a rotor of one or more of an auxiliary alternator or an auxiliary generator. The auxiliary rotatable shaft can be coupled with the engine coupler by the interconnected gears in the housing.

Optionally, the auxiliary rotatable shaft projects from the housing in a location to couple with the rotor of the one or more of the auxiliary alternator or the auxiliary generator that is mounted on the first alternator.

Optionally, the auxiliary rotatable shaft is configured to interconnect with the rotor of the one or more of the auxiliary alternator or the auxiliary generator via a belt.

Optionally, the assembly also includes a tensioner device configured to change tension in the belt.

Optionally, the assembly also includes a mounting bracket configured to be coupled with the first alternator and with the one or more of the auxiliary alternator or the auxiliary generator to support the one or more of the auxiliary alternator or the auxiliary generator on the first alternator.

Optionally, the assembly also includes a rotatable receptacle in the housing. The rotatable receptacle can be coupled with the interconnected gears of the housing. The rotatable receptacle can be configured to interconnect with the shaft of the engine and with the rotor of the alternator to transfer rotation of the shaft of the engine to rotation of the rotor of the alternator.

Optionally, the rotatable engine coupler includes an engine splined shaft configured to mate with the shaft of the engine and to be received in the rotatable receptacle in the housing. The rotatable alternator coupler can include an alternator splined shaft configured to mate with the rotor of the alternator and to be received in the rotatable receptacle in the housing.

Optionally, the rotatable receptacle has internal grooves shaped to mate with ridges on an exterior surface of the engine splined shaft and an exterior surface of the alternator splined shaft.

Optionally, the engine splined shaft and the alternator splined shaft do not abut each other in the rotatable receptacle in the housing.

Optionally, the assembly also includes a flexible isolation coupling configured to interconnect the shaft of the engine with the rotatable engine coupler.

Optionally, the flexible isolation coupling includes plural elongated flexible bodies disposed along an outer circumference of the rotatable engine coupler. Each of the elongated flexible bodies can be rotatably coupled with the rotatable engine coupler at a first end of the elongated flexible body and is configured to be rotatably coupled with the shaft of the engine at an opposite, second end of the elongated flexible body.

Optionally, the powered system is a vehicle, such as a locomotive.

In one embodiment, a shaft assembly includes a rotatable engine coupler configured to be connected with a gearbox assembly and with a rotatable shaft of an engine, and a rotatable alternator coupler configured to be connected with the gearbox assembly and with a rotor of an alternator. Both the engine coupler and the alternator coupler are configured to be inserted into a common rotatable receptacle in the gearbox assembly to translate rotation of the shaft of the engine to rotation of the rotor of the alternator.

Optionally, the engine coupler includes a splined outer surface configured to mate with a grooved inner surface of the receptacle of the gearbox assembly.

Optionally, the alternator coupler includes a splined outer surface configured to mate with a grooved inner surface of the receptacle of the gearbox assembly.

Optionally, the engine coupler and the alternator coupler do not abut each other in the receptacle of the gearbox assembly.

Optionally, the assembly also includes a flexible isolation coupling connected with the engine coupler and configured to interconnect the shaft of the engine with the engine coupler.

Optionally, the flexible isolation coupling includes plural elongated flexible bodies disposed along an outer circumference of the engine coupler. Each of the elongated flexible bodies can be rotatably coupled with the engine coupler at a first end of the elongated flexible body and can be configured to be rotatably coupled with the shaft of the engine at an opposite, second end of the elongated flexible body.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. An engine system comprising:
    a gearbox assembly that includes a housing having plural interconnected gears disposed between an engine side of the housing and an alternator side of the housing;
    a rotatable engine coupler connected with the engine side of the housing, the engine coupler configured to engage a rotatable shaft of a replacement engine; and
    a rotatable alternator coupler connected with the alternator side of the housing, the alternator coupler configured to engage a rotor of a first alternator,
    wherein the housing is configured to be positioned between the replacement engine that replaces a previous engine of a powered system and the first alternator,
    wherein the engine coupler is configured to engage the replacement engine that is resiliently mounted in the powered system and the alternator coupler is configured to engage the first alternator that is rigidly mounted in the powered system to transfer rotation of the shaft of the replacement engine to rotation of the rotor of the first alternator.

2. The engine system of claim 1, wherein the alternator coupler and the housing are configured to support and radially position the rotor of the alternator.

3. The engine system of claim 1, further comprising:
    an auxiliary rotatable shaft projecting from the housing and configured to interconnect with a rotor of one or more of an auxiliary alternator or an auxiliary generator, the auxiliary rotatable shaft coupled with the engine coupler by the interconnected gears in the housing.

4. The engine system of claim 1, further comprising:
    an inlet conduit coupled with the housing and fluidly coupled with an interior chamber in the housing, the inlet conduit configured to be fluidly coupled with a liquid lubrication circuit of the engine, the inlet conduit also configured to direct lubricant in the liquid lubrication circuit of the engine into the interior chamber of the housing; and an outlet conduit coupled with the housing and fluidly coupled with the interior chamber in the housing, the outlet conduit configured to be fluidly coupled with a lubricant reservoir of the liquid lubrication circuit of the engine, the outlet conduit also configured to direct the lubricant in the interior chamber of the housing to the lubricant reservoir of the liquid lubrication circuit of the engine.

5. The engine system of claim 1, further comprising:

a rotatable receptacle in the housing, the rotatable receptacle coupled with the interconnected gears of the housing, the rotatable receptacle configured to interconnect with the shaft of the engine and with the rotor of the alternator to transfer rotation of the shaft of the engine to rotation of the rotor of the alternator.

6. The engine system of claim 1, further comprising:

a flexible isolation coupling configured to interconnect the shaft of the engine with the rotatable engine coupler.

7. The engine system of claim 1, wherein the powered system is a vehicle.

8. The engine system of claim 1, further comprising:

a compressor shaft configured to be coupled with an air compressor and to be rotated by the engine to power the air compressor; and a flexible disc coupler configured to connect the compressor shaft with the shaft of the engine, wherein the flexible disc coupler is configured to flex and absorb torsional variations in one or more of the compressor shaft, the shaft of the engine, or the rotor of the first alternator.

9. An engine system comprising:

a gearbox assembly that includes a housing having plural interconnected gears disposed between an engine side of the housing and an alternator side of the housing, the housing configured to be positioned between a replacement engine that replaces a previous engine of a powered system and a first alternator;

a rotatable engine coupler connected with the engine side of the housing, the engine coupler configured to engage a rotatable shaft of the replacement engine;

a rotatable alternator coupler connected with the alternator side of the housing, the alternator coupler configured to engage a rotor of the first alternator, wherein the engine coupler is configured to engage the replacement engine and the alternator coupler is configured to engage the first alternator to transfer rotation of the shaft of the replacement engine to rotation of the rotor of the first alternator; and an auxiliary rotatable shaft projecting from the housing and configured to interconnect with a rotor of one or more of an auxiliary alternator or an auxiliary generator, the auxiliary rotatable shaft coupled with the engine coupler by the interconnected gears in the housing.

10. The engine system of claim 9, wherein the alternator coupler and the housing are configured to support and radially position the rotor of the alternator.

11. The engine system of claim 9, wherein the interconnected gears in the housing are configured to increase a rotational speed at which the engine coupler is rotated by the shaft of the engine to a faster rotational speed at which the auxiliary rotatable shaft rotates.

12. The engine system of claim 9, wherein the engine coupler is configured to engage the replacement engine that is resiliently mounted in the powered system and the alternator coupler is configured to engage the first alternator that is rigidly mounted in the powered system.

13. The engine system of claim 9, wherein the auxiliary rotatable shaft projects from the housing in a location to couple with the rotor of the one or more of the auxiliary alternator or the auxiliary generator that is mounted on the first alternator.

14. The engine system of claim 9, wherein the auxiliary rotatable shaft is configured to interconnect with the rotor of the one or more of the auxiliary alternator or the auxiliary generator via a belt.

15. The engine system of claim 9, further comprising:

a mounting bracket configured to be coupled with the first alternator and with the one or more of the auxiliary alternator or the auxiliary generator to support the one or more of the auxiliary alternator or the auxiliary generator on the first alternator.

16. The engine system of claim 1, wherein the gearbox assembly includes a closed loop lubrication system fluidly coupled with an interior chamber inside the housing and configured to be fluidly coupled with a liquid lubrication circuit of the replacement engine, the closed loop lubrication system configured to direct lubricant in the replacement engine into the interior chamber of the housing and to direct the lubricant exiting the interior chamber back to the liquid lubrication circuit of the replacement engine.

17. The engine system of claim 16, wherein the closed loop lubrication system includes an inlet conduit coupled with the housing and fluidly coupled with the interior chamber in the housing, the inlet conduit configured to be fluidly coupled with the liquid lubrication circuit of the replacement engine to direct lubricant in the liquid lubrication circuit of the replacement engine into the interior chamber of the housing.

18. The engine system of claim 16, wherein the closed loop lubrication system includes an outlet conduit coupled with the housing and fluidly coupled with the interior chamber in the housing, the outlet conduit configured to be fluidly coupled with a lubricant reservoir of the liquid lubrication circuit of the replacement engine to direct the lubricant in the interior chamber of the housing to the lubricant reservoir of the liquid lubrication circuit of the replacement engine.

19. The engine system of claim 16, wherein the housing is configured to couple with the replacement engine that is resiliently mounted in the powered system and with the first alternator that is rigidly mounted in the powered system to transfer the rotation of the shaft of the replacement engine to rotation of the rotor of the first alternator.

* * * * *